United States Patent
Acheson et al.

(10) Patent No.: US 9,872,433 B2
(45) Date of Patent: Jan. 23, 2018

(54) SYSTEM AND METHOD FOR ADJUSTING HARVEST CHARACTERISTICS

(71) Applicant: Raven Industries, Inc., Sioux Falls, SD (US)

(72) Inventors: John Earl Acheson, Sioux Falls, SD (US); Alex John Weidenbach, Brandon, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 15/154,526

(22) Filed: May 13, 2016

(65) Prior Publication Data

US 2016/0330906 A1    Nov. 17, 2016

Related U.S. Application Data

(60) Provisional application No. 62/161,526, filed on May 14, 2015.

(51) Int. Cl.
| | | |
|---|---|---|
| A01D 41/00 | (2006.01) | |
| E02F 3/00 | (2006.01) | |
| E02F 9/00 | (2006.01) | |
| A01D 41/127 | (2006.01) | |

(52) U.S. Cl.
CPC ................... *A01D 41/127* (2013.01)

(58) Field of Classification Search
CPC ........ A01D 29/00; A01D 31/00; A01D 33/00; A01D 41/00; E02F 3/00; E02F 9/00
See application file for complete search history.

(56) References Cited

U.S. PATENT DOCUMENTS

| 9,563,848 | B1* | 2/2017 | Hunt | G06N 5/045 |
|---|---|---|---|---|
| 2006/0015253 | A1 | 1/2006 | Ochs et al. | |
| 2014/0262547 | A1 | 9/2014 | Acheson et al. | |
| 2015/0293029 | A1* | 10/2015 | Acheson | G01N 33/0098 356/51 |
| 2015/0293068 | A1 | 10/2015 | Acheson et al. | |
| 2016/0044862 | A1* | 2/2016 | Kocer | A01C 23/007 111/118 |

(Continued)

OTHER PUBLICATIONS

Acheson, John E., et al., "Yield Monitor Calibration Method and System", U.S. Appl. No. 15/081,087, filed Mar. 25, 2016, 29 pgs.

*Primary Examiner* — Yonel Beaulieu
(74) *Attorney, Agent, or Firm* — Schwegman Lundberg & Woessner, P.A.

(57) ABSTRACT

The systems and methods described herein adjust harvest characteristics by selecting one or more harvest characteristics according to the location of a harvester within a field. For example, the selection includes determining the location of the harvester within the field, associating the location with a corresponding zone of a plurality of zones in the field where each of the plurality of zones corresponds to a respective crop planted within the field (for instance a hybrid type), and assigning one or more harvest characteristics to a harvest operation according to at least the corresponding zone and the respective crop within the corresponding zone. Harvest operations are conducted with the assigned one or more harvest characteristics. The systems and methods described repeat selecting the one or more harvest characteristics as the harvester changes location within the field according to further examples.

49 Claims, 9 Drawing Sheets

(56) References Cited

U.S. PATENT DOCUMENTS

| | | | |
|---|---|---|---|
| 2016/0232621 A1* | 8/2016 | Ethington | G06Q 10/06315 |
| 2016/0309646 A1* | 10/2016 | Starr | A01C 21/007 |
| 2017/0038304 A9* | 2/2017 | Acheson | G01N 33/0098 |
| 2017/0042081 A1* | 2/2017 | Zumbach | G01N 1/08 |

* cited by examiner

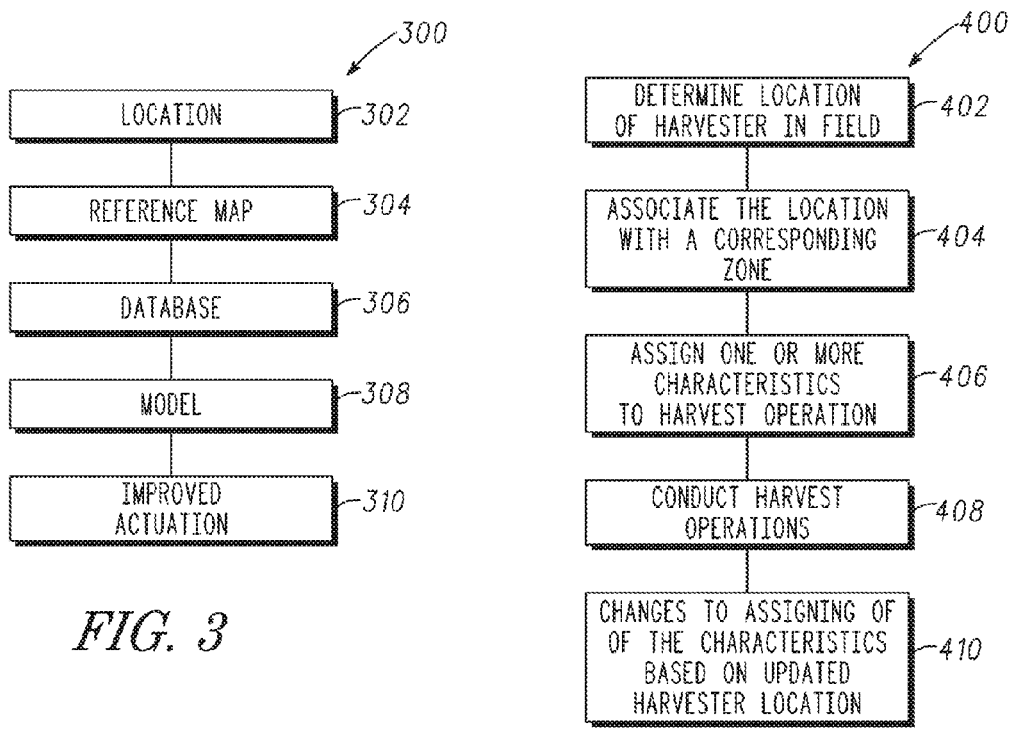
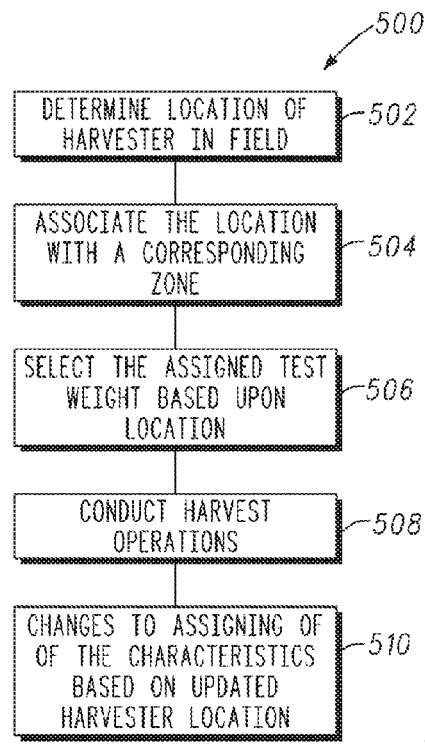

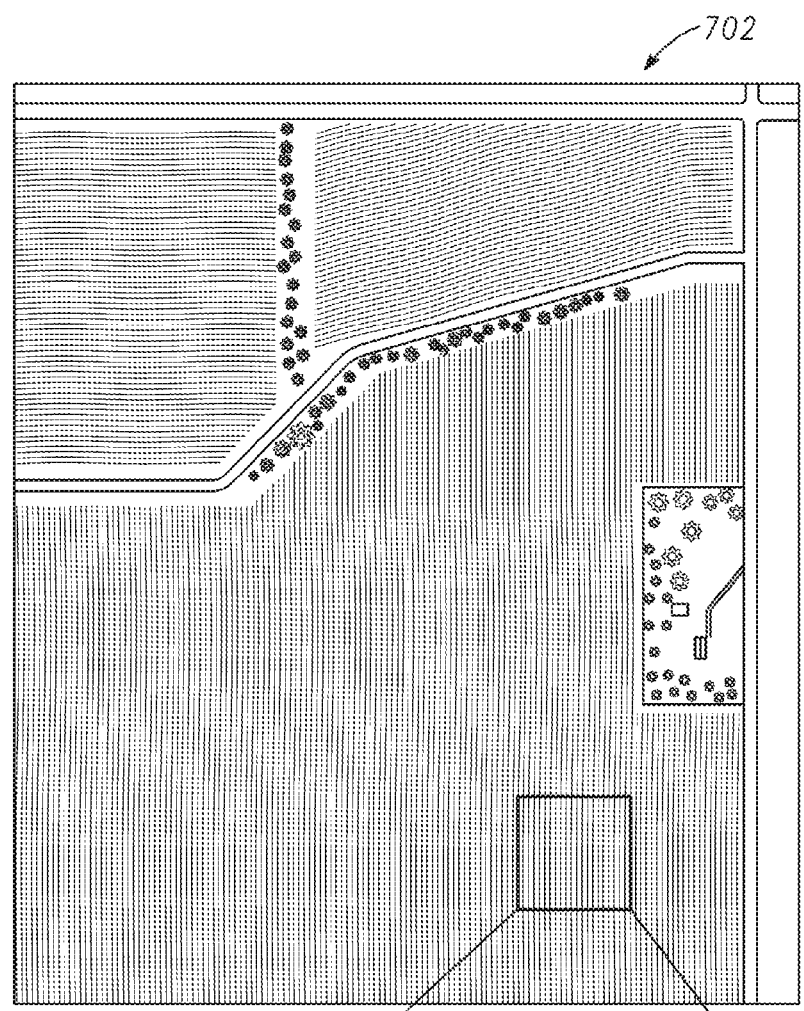
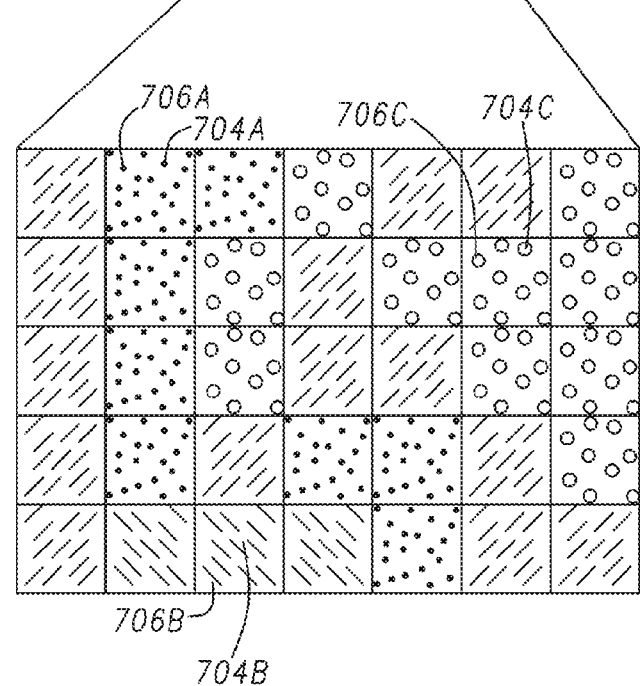
FIG. 7

| BRAND HYBRID No. | TRAITS | YIELD | HARV MST | $/ACRE* | FINAL STAND | STK LDG | EMG | TW |
|---|---|---|---|---|---|---|---|---|
| STEYER 11504 VT2PRO | RR,CB,CEW | 241.9** | 20.3 | $1,053.72 | 360 | 0 | 93 | 60.2 |
| AGRIGOLD HYBRIDS A6517VT3PRIB | RR,CB,RW | 241.1* | 16.6 | $1,073.99 | 345 | 0 | 96 | 55.9 |
| INVERSION FS 62MV4 RIB | RR,CB,RW | 234.4* | 18.6 | $1,033.00 | 359 | 0 | 95 | 58.7 |
| STEWART SEEDS 8V623RIB | RR,CB,RW | 234.3* | 17.3 | $1,041.70 | 366 | 0 | 95 | 59.5 |
| NK N74R-3000GT BRAND | GT,CB,RW,LL | 233.9* | 19.4 | $1,025.18 | 358 | 0 | 91 | 57.7 |
| BECK'S XL 6575HR | RR,CB,LL | 233.4* | 21.0 | $1,011.79 | 334 | 1 | 94 | 58.4 |
| LG SEEDS LG2620 | NON-GMO | 232.3* | 17.2 | $1,033.50 | 373 | 0 | 99 | 57.5 |
| AGRIGOLD HYBRIDS A6559VT2PRO | RR,CB,RW | 232.2* | 19.7 | $1,015.64 | 356 | 0 | 95 | 59.7 |
| BRCK'S BECK 6348A3 | GT,CB,RW,LL | 228.2* | 19.4 | $1,000.20 | 353 | 0 | 98 | 57.5 |
| CHANNEL 212-86STXRIB | RR,CB,RW,LL | 227.5* | 18.5 | $1,003.28 | 371 | 0 | 98 | 59.8 |
| DEKALB DKC63-33RIB | RR,CB,RW,LL,CEW | 226.9* | 17.8 | $1,005.39 | 383 | 0 | 97 | 60.7 |
| INVISION FS 635X1 RIB | RR,CB,RW,LL | 226.9* | 21.0 | $983.61 | 373 | 0 | 98 | 58.3 |
| DYNA-GRO D53SS22 | RR,CB,RW | 225.4* | 18.5 | $994.01 | 368 | 3 | 95 | 59.1 |
| MYCOGEN SEEDS 2C786 | RR,CB,RW,LL | 224.5* | 19.5 | $983.31 | 377 | 0 | 97 | 57.5 |
| SEED CPNSULTANTS SC 11AQ43 | GT,CB,RW,LL | 224.5* | 19.8 | $981.29 | 372 | 0 | 96 | 57.2 |

*FIG. 8*

| ZONE | VOLUME (IN³/SEC) | WEIGHT (LBM/SEC) | TEST WEIGHT F(VOLUME, WEIGHT) | MOISTURE CONTENT (PERCENTAGE) | TEMPERATURE (DEGREES F) | BUSHELS (PER SEC) | BUSHELS TOTAL |
|---|---|---|---|---|---|---|---|
| $Z_1$ | $V_1$ | $W_1$ | $TW_1$ | $MC_1$ | $T_1$ | $B_1$ | $BT_1$ |
| $Z_2$ | $V_2$ | $W_2$ | $TW_2$ | $MC_2$ | $T_2$ | $B_2$ | $BT_2$ |
| $Z_3$ | $V_3$ | $W_3$ | $TW_3$ | $MC_3$ | $T_3$ | $B_3$ | $BT_3$ |
| $Z_4$ | $V_4$ | $W_4$ | $TW_4$ | $MC_4$ | $T_4$ | $B_4$ | $BT_4$ |
| $Z_5$ | $V_5$ | $W_5$ | $TW_5$ | $MC_5$ | $T_5$ | $B_5$ | $BT_5$ |
| $Z_6$ | $V_6$ | $W_6$ | $TW_6$ | $MC_6$ | $T_6$ | $B_6$ | $BT_6$ |
| $Z_7$ | $V_7$ | $W_7$ | $TW_7$ | $MC_7$ | $T_7$ | $B_7$ | $BT_7$ |
| $Z_8$ | $V_8$ | $W_8$ | $TW_8$ | $MC_8$ | $T_8$ | $B_8$ | $BT_8$ |
| $Z_9$ | $V_9$ | $W_9$ | $TW_9$ | $MC_9$ | $T_9$ | $B_9$ | $BT_9$ |
| $Z_{10}$ | $V_{10}$ | $W_{10}$ | $TW_{10}$ | $MC_{10}$ | $T_{10}$ | $B_{10}$ | $BT_{10}$ |
| $Z_{n+10}$ | $V_{n+10}$ | $W_{n+10}$ | $TW_{n+10}$ | $MC_{n+10}$ | $T_{n+10}$ | $B_{n+10}$ | $BT_{n+10}$ |

| ZONE | HYBRID TYPE | STRIPPER WIDTH | CYLINDER/ROTOR CLEARANCE | CYLINDER/ROTOR SPEED | HARVESTER GROUND SPEED | FAN SPEED | REEL WEIGHT |
|---|---|---|---|---|---|---|---|
| $Z_1$ | $H_1$ | $SW_1$ | $RC_1$ | $RSi_1$ | $HGS_1$ | $FS_1$ | $RW_1$ |
| $Z_2$ | $H_2$ | $SW_2$ | $RC_2$ | $RSi_2$ | $HGS_2$ | $FS_2$ | $RW_2$ |
| $Z_3$ | $H_3$ | $SW_3$ | $RC_3$ | $RSi_{13}$ | $HGS_3$ | $FS_3$ | $RW_3$ |
| $Z_4$ | $H_4$ | $SW_{14}$ | $RC_4$ | $RSi_{14}$ | $HGS_4$ | $FS_4$ | $RW_4$ |
| $Z_5$ | $H_5$ | $SW_5$ | $RC_5$ | $RSi_{15}$ | $HGS_5$ | $FS_5$ | $RW_5$ |
| $Z_6$ | $H_6$ | $SW_6$ | $RC_6$ | $RSi_{16}$ | $HGS_6$ | $FS_6$ | $RW_6$ |
| $Z_7$ | $H_7$ | $SW_7$ | $RC_7$ | $RSi_{17}$ | $HGS_7$ | $FS_7$ | $RW_7$ |
| $Z_8$ | $H_8$ | $SW_8$ | $RC_8$ | $RSi_{18}$ | $HGS_8$ | $FS_{18}$ | $RW_8$ |
| $Z_9$ | $H_9$ | $SW_9$ | $RC_9$ | $RSi_9$ | $HGS_9$ | $FS_9$ | $RW_9$ |
| $Z_{10}$ | $H_{10}$ | $SW_{10}$ | $RC_{10}$ | $RSi_{10}$ | $HGS_{10}$ | $FS_{10}$ | $RW_{10}$ |
| $Z_{n+10}$ | $H_{n+10}$ | $SW_{n+10}$ | $RC_{n+10}$ | $RSi_{n+10}$ | $HGS_{n+10}$ | $FS_{n+10}$ | $RW_{n+10}$ |

FIG. 11

| ZONE | HYBRID TYPE | ESTIMATE TOTAL WEIGHT | ACTUAL TEST WEIGHT | YIELD CONSTANT | VARIABLE RELATED TO YIELD | YIELD FACTOR | SENSOR PARAMETER |
|---|---|---|---|---|---|---|---|
| $Z_1$ | $H_1$ | $W_1$ | $TW_1$ | $YC_1$ | $V_1$ | $B_1$ | $BT_1$ |
| $Z_2$ | $H_2$ | $W_2$ | $TW_2$ | $YC_2$ | $V_2$ | $B_2$ | $BT_2$ |
| $Z_3$ | $H_3$ | $W_3$ | $TW_3$ | $YC_3$ | $V_3$ | $B_3$ | $BT_3$ |
| $Z_4$ | $H_4$ | $W_{14}$ | $TW_4$ | $YC_4$ | $V_4$ | $B_4$ | $BT_4$ |
| $Z_5$ | $H_5$ | $W_{15}$ | $TW_5$ | $YC_5$ | $V_5$ | $B_5$ | $BT_5$ |
| $Z_6$ | $H_6$ | $W_6$ | $TW_6$ | $YC_6$ | $V_6$ | $B_6$ | $BT_6$ |
| $Z_7$ | $H_7$ | $W_7$ | $TW_7$ | $YC_7$ | $V_7$ | $B_7$ | $BT_7$ |
| $Z_8$ | $H_8$ | $W_8$ | $TW_8$ | $YC_8$ | $V_8$ | $B_8$ | $BT_8$ |
| $Z_9$ | $H_9$ | $W_9$ | $TW_9$ | $YC_9$ | $V_9$ | $B_9$ | $BT_9$ |
| $Z_{10}$ | $H_{10}$ | $W_{10}$ | $TW_{10}$ | $YC_0$ | $V_{10}$ | $B_{10}$ | $BT_{10}$ |
| $Z_{n+10}$ | $H_{n+10}$ | $W_{n+10}$ | $TW_{n+10}$ | $YC_{n+10}$ | $V_{n+10}$ | $B_{n+10}$ | $BT_{n+10}$ |

SYSTEM AND METHOD FOR ADJUSTING HARVEST CHARACTERISTICS

CROSS REFERENCE TO RELATED APPLICATIONS

This patent application claims the benefit of priority to U.S. Provisional Application Ser. No. 62/161,526, filed on May 14, 2015, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S.D. All Rights Reserved.

TECHNICAL FIELD

This document pertains generally, but not by way of limitation, to systems and methods for adjusting harvest characteristics.

BACKGROUND

Yield monitor systems are used to measure crop yields during harvesting. Yield characteristics, such as weight or volume, are used to assess the quality and quantity of a crop and accordingly determine its purchase price. According to an example, a yield equation that assesses the quality and quantity of a crop is based on four distinct variables and a fifth related variable. In one example, the four variables include volume, temperature, moisture and test weight of the harvested crop. The fifth related variable is the weight of the harvested crop, and at least in some yield monitors the weight is determined according to the volume and test weight (e.g., a quantity similar to density).

According to one example, the test weight is input by the harvester operator based upon assumptions related to the harvested crop including observed field conditions, the crop being harvested, as well as the experience of the operator.

OVERVIEW

The present inventors have recognized, among other things, that a problem to be solved includes decreasing inaccuracy of yield measurements in harvesters. More particularly, the present inventors have recognized methods of minimizing error in the calculation of test weight. Such error can be relatively large (e.g., up to twelve percent). This error negatively impacts the accuracy of the yield when calculated. The genesis of the error is due to most grain monitor's reliance on a single test weight for calculation even as test weight varies between hybrid types harvested. Because the test weight is a measure of density, grain monitors that rely on volume based sensors for measurement have weight errors equal to the error in test weight. Similarly, grain monitors that use weight based sensors for measurement have volume errors equal to the error in test weight.

In an example, the present subject matter provides systems and methods that determine a location of a harvester in the field such as by GPS, user input, or the like. A reference map is generated showing locations of various hybrids within the field. The reference map is created using hybrid information obtained during planting (e.g., what hybrid is planted where in the field based upon user input, bar code scanning, GPS, or the like). A database or similar reference memory is accessed to determine hybrid specific characteristics (e.g., test weight, average yield, average moisture content, average weight, average volume, traits, and the like) of the hybrid type currently being harvested based upon the location information and the reference map. One or more models are developed based upon the hybrid specific characteristics. The one or more models are used to alter one or more harvest characteristics based upon the hybrid specific characteristics of the specific hybrid type being harvested at that location in the field. For example, the one or more models are implemented to change one or more operations of the harvester for optimization of harvest based upon the hybrid specific characteristics of the specific hybrid type being harvested at that location in the field. In some embodiments, the one or more models additionally or alternatively optimize processing of and the gathering of real-time crop information (e.g., an actual test weight, a volume, a weight, a moisture content, a yield, and the like) via one or more sensors mounted to the harvester based upon the hybrid specific characteristics of the specific hybrid type being harvested at that location in the field.

The present subject matter provides a solution to the problem of assuming uniform test weight across the field as discussed above, such as by correlating test weight to hybrid type. This correlation allows the test weight or some other harvest characteristic used for the yield monitor to be changed according to the crop including the hybrid type. This provides for increased accuracy with respect to the test weight and correspondingly increased accuracy with respect to calculation of the yield.

According to some embodiments, the systems and methods described herein adjust harvest characteristics by selecting one or more harvest characteristics according to the location of a harvester within a field. For example, the selection includes determining the location of the harvester within the field, associating the location with a corresponding zone of a plurality of zones in the field where each of the plurality of zones corresponds to a respective crop planted within the field (for instance a hybrid type), and assigning one or more harvest characteristics to a harvest operation according to at least the corresponding zone and the respective crop within the corresponding zone. Harvest operations are conducted with the assigned one or more harvest characteristics. The systems and methods described repeat selecting the one or more harvest characteristics as the harvester changes location within the field according to further examples.

The present inventors have also recognized that the estimated test weight (e.g., a database value that is a statistical average based upon a historical average for the applicable hybrid type being harvested) and other data specific to the hybrid type being harvested in a particular zone may be used to increase the accuracy of determining an actual test weight. According to one example, the actual test weight is calculated with data gathered contemporaneously with the harvest using one or more sensors (e.g., one or more of moisture, temperature, weight and volume sensors). The systems and methods determine the actual test weight according to the location of the harvester in the field in view of the estimated test weight corresponding to which of the plurality of zones the harvester is located in and further based upon a measured (e.g. sensed) test weight as measured by the one or more instruments on the harvester. For example, as the harvester travels across the field it transitions from a first zone having a first hybrid planted therein to a second zone having a second hybrid planted therein. Data collection and processing techniques are changed at the transition between the first zone and the second zone. This avoids smearing (e.g., jumbling) of data from the first hybrid and the second hybrid together and thereby allows for better data resolution. Accordingly, variations in test weight or other harvest characteristics between crops or hybrid types are not mixed with measurements, calculations, harvest operation or the like configured for another crop or hybrid type. Knowing this information, the location of the harvester in the field and the location of the change between the first hybrid and the second hybrid, the calculation of actual test weight becomes more accurate. Thus, when the harvester crosses zones from the first hybrid to the second hybrid, a step change in test weight is expected (and implemented immediately or according to a delay as described herein). Knowing this, calculation of the actual test weight of the first hybrid ceases and a new calculation of the actual test weight of the second hybrid begins at the transition between zones. This allows for better filtering and packaging of data, avoiding the smearing discussed previously. According to further examples, estimated test weight is used in the calculation of actual test weight as a way of identifying statistically relevant deviations from the historical range. Such deviations are flagged as possible measurement errors or as other statistically significant events.

Further, the present inventors have recognized that harvest characteristics extend beyond calculation of test weight and yield such as to one or more of aspects of the harvester operation or gathering or processing of sensor data. The present inventors realize that harvester operation and the gathering or processing of sensor data are negatively impacted if a single hybrid type is assumed. For example, if the harvester is operated at substantially a uniform speed based upon the assumption of a single hybrid type, such operation may be less than optimal as test weight (density) and other harvest characteristics vary according to hybrid type and crop type across the field. Stated another way, the speed of the harvester may be too high in areas of the field where the test weight (density) for a first hybrid type is relatively high and too low in areas of the field where the test weight (density) for a second hybrid type is relatively low. Therefore, the systems and methods recognize that the one or more harvest characteristics including one or more of an estimated test weight, an actual test weight, one or more aspects related to a yield calculation, a parameter or calculation related to a sensor, and a harvester operation may be changed according to hybrid type applicable to the location in the field.

With regard to the harvest operation, the systems and methods change one or more of a ground speed, a width of stripper/deck plates, a cylinder/rotor clearance, a cylinder/rotor speed, an opening or closing of sieves, a fan/blower speed, a header height, and a reel height of the harvester in the field based upon a hybrid type of the crop and according to the location of the harvester in the field (within zones that are indexed with the appropriate planted hybrid types), for example. For example, as the harvester travels across the field it transitions from a first zone having a first hybrid planted therein to a second zone having a second hybrid planted therein. Data gathered by a sensor (e.g., one or more of a moisture sensor, a volume sensor, and a weight sensor) is converted according to the particular crop and hybrid type to provide for an accurate measurement of crop moisture, weight, volume, or the like. As the change between the first hybrid to the second hybrid occurs, the crop moisture, weight, volume, or the like changes. Knowing this change in crop moisture, weight, volume, or the like is about to or is occurring, models governing the calculation of the moisture, the volume, the weight, or the like are changed to be more accurate in calculating the moisture, the volume, the weight, or the like of the crop in real-time. Thus, the systems and methods disclosed herein provide for adaptive modeling based upon the hybrid specific characteristics of the specific hybrid type being harvested at that location in the field.

According to further examples, sensed moisture content, weight, volume, and the like are compared to historical averages of the moisture, the volume, the weight, or the like and statistically relevant deviations from that range are flagged as possible errors or other statistically significant events.

Additionally, the systems and methods disclosed extend to planting operations and record keeping functions in addition to harvest related activities. For example, the systems and methods may include a planting map that is generated during a planting operation before conducting the harvest operation. According to one example, the planting map includes the one or more harvest characteristics associated with each zone of the plurality of zones. The planting map is manually generated or automatically generated using an identifier such as a bar code to first identify the seeds planted (e.g. two or more hybrid types) and then a plot of the hybrid types and corresponding zones according to actual planting is undertaken. According to further examples, the systems and methods store a plurality of data associated with the plurality of harvest characteristics, for example, the location of the harvester/planter in the field, the hybrid type corresponding to that location in the field, and yield values (e.g., for each hybrid type generally, on a per zone basis or the like). The data is used, analyzed, or implemented including in planning future seed prescriptions. Additionally, the systems and method described herein calculate one or more of a yield per each of the two or more of hybrid types, a yield per zone with reference to a planting map, an actual test weight per hybrid per each of the two or more of hybrid types, a moisture content per each of the two or more of hybrid types, a yield at one or more locations in the field, a test weight at one or more locations in the field, and a moisture content per location in the field according to further examples. These calculated values are optionally displayed to the operator or other personnel during or following the harvest, stored for future use and analysis or the like.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components.

The drawings illustrate generally, by way of example, but not by way of limitation, various embodiments discussed in the present document.

FIG. 3 is a block diagram of one example of a method according to an example embodiment.

FIG. 4 is a block diagram of another example of a method according to another example embodiment.

FIG. 5 is a block diagram of yet another method according to another yet example embodiment.

FIG. 7 is a schematic view of a harvest map according to another example including a plurality of zones, each zone associated with a particular hybrid type and includes an enlargement of a portion of the map illustrating particular hybrids associated with particular zones.

FIG. 8 is a view of one example of a database utilized with the systems and methods disclosed herein including an estimated test weight per hybrid type.

FIG. 9 is a view of another example database including harvest characteristics associated with each hybrid type according to zone are provided including an estimated weight, estimated volume, estimated test weight, estimated yield.

FIG. 10 is an illustration of another database according to an example embodiment where the harvest characteristics include one or more harvester (operation) characteristics or gathered/processed sensor data.

FIG. 11 is an illustration of yet another database according to an example embodiment including additional harvest characteristics such as estimated test weight, actual test weight, one or more aspects related to a yield calculation (e.g., a filter, a constant, a factor, a variable or the like), a parameter or calculated value related to a sensor, or the like.

DETAILED DESCRIPTION

Figure 1:
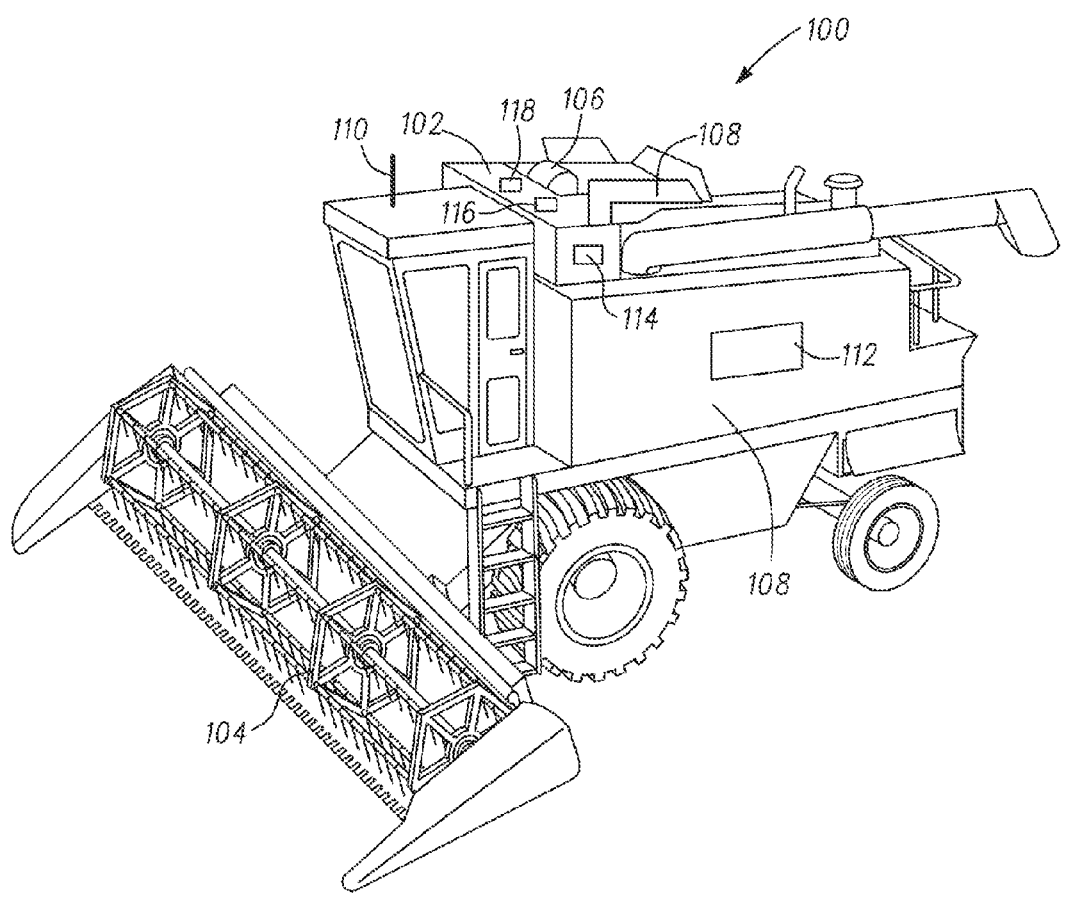
FIG. 1 is a perspective view of one example of a harvester including a system for one or more of selecting and adjusting one or more harvest characteristics.

According to some embodiments, the systems and methods described herein adjust harvest characteristics by selecting one or more harvest characteristics according to the location of a harvester within a field. For example, the selection includes determining the location of the harvester within the field, associating the location with a corresponding zone of a plurality of zones in the field where each of the plurality of zones corresponds to a respective crop planted within the field (for instance a hybrid type), and assigning one or more harvest characteristics to a harvest operation according to at least the corresponding zone and the respective crop within the corresponding zone. Harvest operations are conducted with the assigned one or more harvest characteristics. The systems and methods described repeat selecting the one or more harvest characteristics as the harvester changes location within the field according to further examples.

The one or more harvest characteristics include, but are not limited to, one or more of an estimated test weight, an actual test weight, one or more aspects (a filter, a constant, a factor, a variable, or the like) related to a yield calculation, a calculation parameter related to a sensor (e.g., a particular algorithm used, a constant, error correction, statistical weight or the like) or the like. These one or more harvest characteristics when selected and assigned to various harvester operations for the particular zone control the harvest operations of the harvester 100 within that zone. The harvest operations controlled with the assigned harvest characteristics include, but are not limited to, one or more of ground speed, width of stripper/deck plates, cylinder/rotor clearance, cylinder/rotor speed, opening or closing of sieves, fan/blower speed, header height, a reel height of the harvester or the like.

As discussed herein, the systems and methods have application to various areas related to the harvest. For example, the systems and methods are optionally used as a component of yield monitors to increase accuracy in test weight to increase the accuracy of the grain monitor. According to some embodiments, a change in crop type (e.g., hybrid type), test weight, or other harvest characteristics is utilized as an input into an advanced yield monitor solution. According to further examples, the systems and methods include one or more of hybrid or test weight tracking capability. This tracking capability provides an independent test weight measurement solution that measures the test weight of each hybrid. Using a change in the hybrid as an input into its solution, the tracking system detects sudden changes of test weight and adjusts its solution accordingly. Further embodiments enhance a grain tracking monitor by exporting one or more of a currently harvested hybrid, test weight, or harvest characteristics data to a grain tracking monitor. In some cases, the monitor includes the currently harvested hybrid, actual test weight, one or more harvest characteristics data in a report to a farmer. According to further examples, at least one of the monitor and a grain cart adjusts yield totals based on the hybrid, actual test weight, or the one or more harvest characteristics.

FIG. 1 shows a harvester 100 that includes a body 102 and a header 104 movably coupled with the body 102. In one example, the header 104 is used to cut and divide crops, such as grain, and deliver the grain into the body 102 for further processing. Referring again to FIG. 1, in one example the harvester 100 includes a harvester elevator 106 configured to remove processed grain from the internal mechanisms of the harvester 100 and deposit the grain within a grain tank 108. As further shown in FIG. 1 an antenna, such as a GPS antenna 110, is provided on the body 102 to provide accurate position data of the harvester 100, for instance while harvesting within a field. The harvester 100 also includes a controller 112 (e.g., a computer, programmed logic controller, transceiver in communication with a control system or the like) that communicates with sensors 114, 116, and 118 and receives location data related to the harvester 100.

In one embodiment, the sensors include, but are not limited to, a moisture sensor 114, a weight sensor 116 and a volume sensor 118. The sensors 114, 116, 118 gather data related to the crop harvested. Further information regarding the sensors and operation thereof, and other aspects of the harvester are found in U.S. application Ser. No. 13/835,054, filed on Mar. 15, 2013, and entitled "Multi-Variable Yield Monitor And Methods Of The Same"; U.S. application Ser. No. 15/081,087, filed on Mar. 25, 2016, and entitled "Yield Monitor Calibration Method And System"; U.S. application Ser. No. 14/687,723, filed on Apr. 15, 2015, and entitled "Reaping Based Yield Monitoring System And Method For The Same", each of which are incorporated herein in its entirety.

Although three sensors 114, 116, and 118 are illustrated in FIG. 1, according to some embodiments one or more sensors such as the weight sensor 116 and the moisture sensor 114 or the volume sensor 118 and the moisture sensor 114 are utilized without the other sensor or sensors. According to other embodiments, other sensors, such as a temperature sensor are additionally (or alternatively) utilized.

Figure 2:
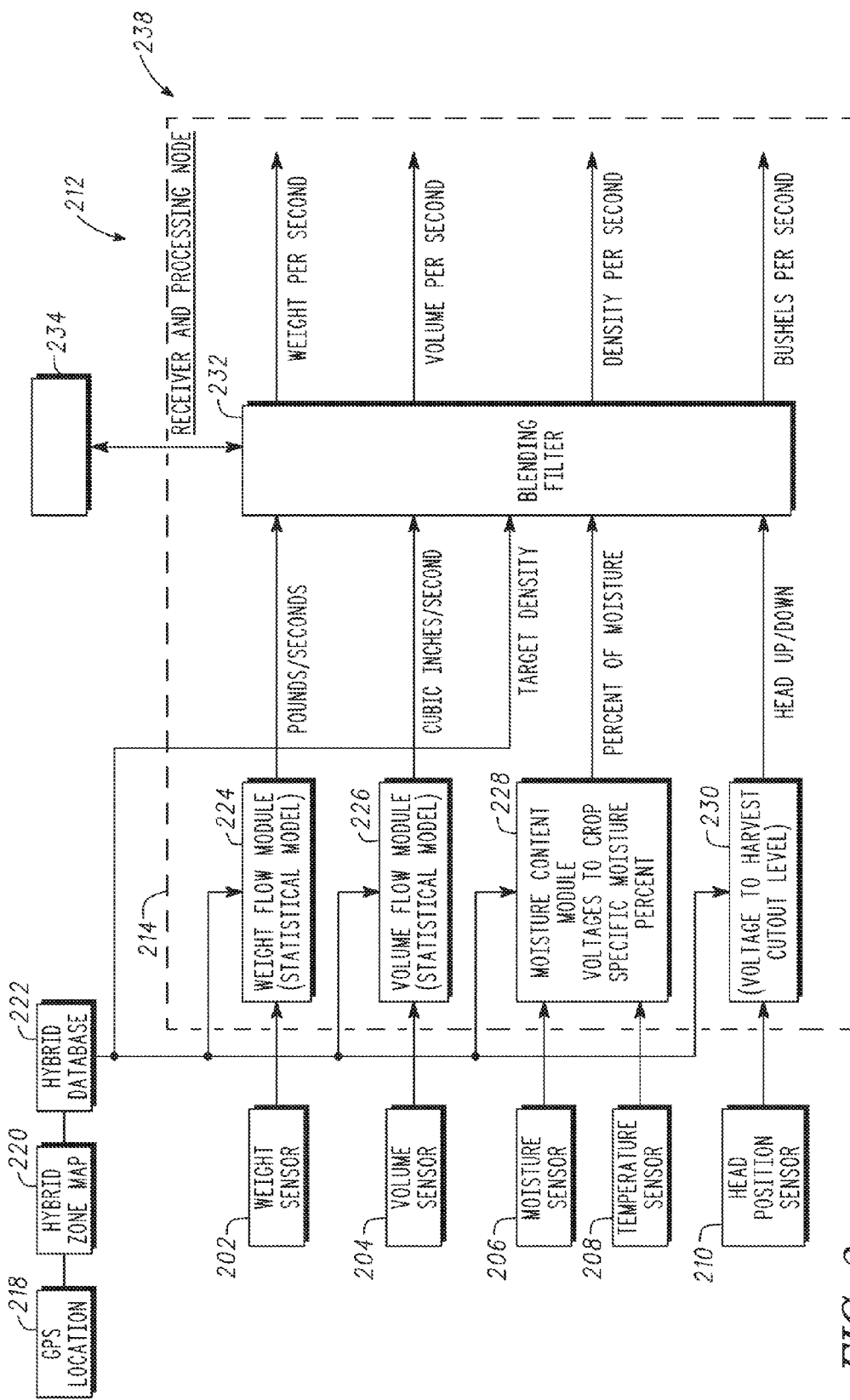
FIG. 2 is a schematic view of one example of a control system that utilizes data from sensors, the harvester location, hybrid zone information, and other information (e.g., an estimated test weight, an estimated weight, an estimated volume, and the like) specific to the particular hybrid in the zone in which the harvester resides in a plurality of operations.

According to some embodiments, the controller 112 controls the operation of one or more of the sensors 114, 116, and 118 or other operations of the harvester 100. Optionally, the controller 112 includes one or more of the sensors 114, 116 and 118. The controller 112 has modules, nodes, memory (e.g., databases including readable and writable memory, a display or the like). One schematic example of a controller 212 is illustrated in FIG. 2. The controller 212 includes a receiver and processing node 214 that utilizes measured values from the sensors 114, 116, and 118, the location of the harvester in the field, and optionally other data (described herein) in order to operate according to the systems and methods disclosed herein.

According to one embodiment a system is disclosed that utilizes some or all of the components of FIGS. 1 and 2. The system includes one or more instruments (e.g., sensors 114, 116, and 118) on a harvester (e.g. harvester 100) and a controller (e.g., at least one of controller 112 or controller 212) that interfaces with these features and the harvester. For exemplary purposes, the embodiment of FIG. 2 is utilized in the discussion below. The one or more instruments (e.g., the weight sensor 202, the volume sensor 204, the moisture sensor 206, the temperature sensor 208, and the head position sensor 210) measure a plurality of harvest information, harvester operating information or the like while the crop is harvested. The controller 212 communicates with the one or more instruments and includes a memory device 234. The memory device 234 includes instructions that, when executed by the controller 212, cause the controller 212 to reference measured values from the one or more sensors and to select one or more harvest characteristics (e.g., an estimated test weight, an actual test weight, one or more aspects (a filter, a constant, a factor, a variable, or the like) related to a yield calculation, a calculation parameter related to a sensor (e.g., a particular algorithm used, a constant, error correction, statistical weight or the like) or the like) of the plurality of harvest characteristics according to the hybrid type and the location of the harvester within a field.

The controller 212 determines location of the harvester within the field (e.g., determined with the GPS antenna 110). According to one example, the location is associated with a corresponding zone of a plurality of zones in the field, each of the plurality of zones indicates a respective crop planted within the field (e.g., a hybrid type planted within that zone). Based on the associated zone and the crop within the zone one or more harvest characteristics (e.g., an estimated test weight, an actual test weight, one or more aspects (a filter, a constant, a factor, a variable, or the like) are assigned by the controller 112 or 212 that ultimately govern harvest operations (e.g., one or more of ground speed, width of stripper/deck plates, cylinder/rotor clearance, cylinder/rotor speed, opening or closing of sieves, fan/blower speed, header height, a reel height of the harvester or the like) of the harvester 100. More particularly, the one or more harvest characteristics when selected and assigned to various harvester operations for the particular zone control the harvest operations of the harvester 100 within that zone.

As the harvester 100 moves in the field at least one of the controller 112 or controller 212 repeats selection of the one or more harvest characteristics and updates the assignment of the same as the harvester 100 moves out of a previous zone and into another zone. The corresponding harvest operations (examples described herein) similarly update (change, remain static or the like) according to the assignment of the harvest characteristics.

FIG. 2 shows the example controller 212 receives information (e.g., measured values) from sensors 202-210, the harvester location (e.g., obtained from GPS location 218), hybrid zone information (e.g., obtained hybrid zone map 220), and information (e.g., obtained from a hybrid database 222) specific to the particular hybrid in the zone being harvested. Based on the harvester location, the controller 212 then executes instructions that control the harvest operations including one or more of ground speed, width of stripper/deck plates, cylinder/rotor clearance, cylinder/rotor speed, opening or closing of sieves, fan/blower speed, header height, reel height of the harvester or the like.

In examples, information related to one or more of the plurality of harvest characteristics measured by the sensors include, but are not limited to, one or more of weight values from a weight sensor 202, volume values from a volume sensor 204, moisture values from a moisture sensor 206, temperature values from a temperature sensor 208, the detected head position from a head position sensor 210 or the like. In another example, the controller 212 further uses one or more of GPS location 218 (of the harvester 100), a hybrid zone map 220 or a hybrid database 222, which will be discussed in further detail subsequently. As provided in the example shown in FIG. 2, the controller 212 includes a weight flow module 224, a volume flow module 226, a moisture content module 228, a cutout level 230, and a blending filter 232. As discussed herein, these elements 224-232 are used with measured values to determine a yield or one or more characteristics related to, but not limited to, harvester operation or the like.

In another example, the controller 212 includes a yield monitor 238 having the receiver and processing node 214. The receiver and processing node 214 of the yield monitor 238 is configured to determine a yield of the harvested crop based on the determined location of the harvester and the zone associated with the determined location and one or more harvest characteristics (an estimated test weight, an actual test weight, information related to test weight (e.g., sensed weight, sensed volume, sensed moisture content, sensed temperature, sensed location, or the like) one or more aspects (a filter, a constant, a factor, a variable, or the like)) related to a yield calculation.

As will be discussed in further detail herein, the various inputs described above including but not limited to, sensed weight, sensed moisture, sensed volume, sensed temperature, sensed position, sensed head position, or the like, are used by the controller 112 or controller 212 in an example to improve yield calculation accuracy. According to further embodiments various items related to the yield calculation can be updated including a calculation parameter related to a sensor (e.g., a particular algorithm used, a constant, error correction, statistical weight or the like associated with the zone) according to some embodiments. For instance, as the harvester 100 transitions between zones the inputs for yield calculations are updated (e.g., only weights, volumes, actual test weights and the like measured in the zone or associated with the crop indexed to the zone) are used in yield calculations for harvested crops in that zone to generate accurate zone specific yield values. According to one example embodiment, the way the inputs for yield calculations are measured can be updated to improve accuracy. For example, the plurality of sensors include the moisture sensor 206, and the instructions executed by the controller 212 alter the calculation parameters (e.g. an algorithm that converts measured values (e.g., a voltage) into moisture sensor data)

collected by the moisture sensor 206 based upon the one or more harvest characteristics of the crop according to the location in the field. In another embodiment, estimated test weight is used by the controller 212 to improve yield calculation accuracy by accounting for errors caused by sudden changes in test weight when switching crops (e.g. when moving from a first zone having a first hybrid type to a second zone having a second hybrid type). By correlating the change in crop to a change in estimated test weight, the change is measured and accounted for providing more accurate yield data. As such, the system correlates estimated test weight to hybrid type. This correlation allows the estimated test weight or some other harvest characteristic to be changed according to the crop including the hybrid type. This provides the controller 212 or controller 112 with increased accuracy with respect to the estimated test weight and correspondingly increased accuracy with respect to calculation of the yield.

According to one embodiment, the crop includes two or more hybrid types, and the instructions, when executed, cause the controller 212 to calculate one or more of respective yields for each of the two or more of hybrid types, yield per zone with reference to a planting map (described further below), respective average actual test weights for each of the two or more of hybrid types, respective moisture contents for each of the two or more of hybrid types, yield associated with a location in the field, average test weight for a location in the field, and a moisture content for a location in the field according to further example embodiments.

In some embodiments, the controller 212 generates a planting map that assigns each of the plurality of zones with a corresponding hybrid type, and assigns an estimated test weight to each zone of the plurality of zones of the planting map. As used herein, the term "estimated test weight" is an estimated crop density (mass/volume) the estimation is a statistical average based upon a historical average for a particular hybrid type. The estimated test weight is in some examples provided by a seed dealer or producer when purchasing seeds for planting (e.g., it is provided by way of a seed catalog number, bar code provided on the seed documentation or bag, or the like). In at least some examples, the estimated test weight does not account for factors such as moisture content of the crop or the temperature at harvest. According to other embodiments, the controller 212 determines the actual test weight for a harvested crop based on the location of the harvester in the field, the associated zone and based upon one or more sensed inputs (e.g., sensed weight, sensed volume, sensed moisture content, sensed temperature, sensed location, or the like). The actual test weight is based upon the estimated test weight for the zone and a measured test weight gathered in the zone where the harvester is located. As used herein, the term "actual test weight" is a value that is determined from measuring (using sensor gathered information such as one or more of weight, moisture, temperature and volume measured by sensors 202, 204, 206) a weight, a moisture content, and a temperature of the crop during harvest and calculating the density of the crop based upon the measured weight (crop density as determined using one or more of sensed weight or sensed volume), the moisture content and the temperature of the crop. Thus, the actual test weight is a measure of the density of the crop accounting for factors such as the moisture content, the temperature of the crop, the estimated test weight, or the like. In contrast, according to one example the measured test weight is calculated based only upon a measured weight and a measured volume of the crop measured by the corresponding sensors 202, 204 on the harvester 100. According to some embodiments, the measured test weight may not account for factors such as moisture content and the temperature of the crop. In another example, the measured test weight is refined based upon a measured moisture content of the crop as measured by the moisture sensor 206.

The meaning of estimated test weight, measured test weight, actual test weight and their relationships are discussed herein by way of a prophetic example to facilitate understanding of these concepts. The equations provided herein are examples. As discussed herein, estimated test weight (ETW) is a value approximating density for a particular crop or hybrid type. ETWs vary between crops and hybrid types. The ETW for a crop or hybrid type is generally a static value determined by a seed supplier and included in information provided when purchasing seeds.

In contrast to ETW, measured test weight (MTW) is a calculated value based on sensor inputs provided by the systems described herein including the controller 212 in communication with the sensors 202-208. In one example, MTW is based on volume and weight measurements that are corrected to account for variations caused by moisture and temperature (wherein temperature affects moisture values). One example of MTW is calculated as provided herein based on corrected (dry) volume and mass values.

$$volumeDry = Kv * volumeWet$$

Where volumeWet is a measured volume of the harvested crop or hybrid type (e.g., from the volume sensor 204). Kv is a moisture coefficient dependent on a current moisture value (e.g., a percentage), a standardized moisture value (e.g., a percentage) and optionally temperature. Moisture and temperature are measured in one example by the system described herein including the moisture and temperature sensors, 206, 208.

$$massDry = Km * massWet$$

Where massWet is a measured mass of the harvested crop or hybrid type (e.g., from the weight sensor 202). Km is another moisture coefficient dependent on the current moisture value (e.g., a percentage), the standardized moisture value (e.g., a percentage) and optionally temperature. MTW is, in one example, based on the massDry and volumeDry values as provided below.

$$MTW = \frac{massDry}{volumeDry}$$

As shown, in this example the MTW is a test weight value based on measured values for the harvested crop (volume and weight) that, in this example, account (correct) for moisture and temperature variations. In other examples, MTW is determined without correction for moisture and temperature. In still other examples, MTW is corrected for moisture and temperature after determination of a base (wet) MTW using mass and volume measurements alone. Optionally, MTW is determined by using the estimated test weight in combination with one of weight or volume measurements (and optionally corrected for moisture and temperature). Stated another way, with one of the weight (mass) or volume measurements and the estimated test weight (density) the corresponding volume or weight values are thereby determined.

Based on variations in moisture, temperature and the like the MTW of this example varies relative to the ETW. As discussed herein, actual test weight (ATW) is one measure used to blend measured and estimated test weights to accurately represent crop or hybrid type test weights while accounting for variations (e.g., with MTW) and an expected value (e.g., with ETW). Further, ATW is used with yield calculations to determine one or more yield values of a harvested crop (e.g., weight per second, volume per second or bushels per second). In one example, ATW is a function of both ETW and MTW as described herein and each of ETW and MTW is optionally weighted based on (but not limited to) one or more of variation of the ATW (or MTW as variable component of ATW) relative to the ETW; consistency of MTW values; variation of the ATW (or MTW) relative to a geospatial test weight (GTW), such as measured test weights previously determined to the right or left of the harvester head (e.g., on previous passes) or the like. For example, ATW in some examples is represented as follows.

$$ATW=MTW(Ka)+ETW(1-Ka)$$

Where Ka is a gain (e.g., weight, multiplier or the like) that varies based on one or more of variation of the ATW (or MTW) from the ETW or consistency of the MTW (e.g., the degree of variation of MTW). For instance, Ka is decreased (toward a value of 0) where the ATW (or MTW) varies significantly from the ETW to ensure the ETW is favored in the ATW determination. Conversely, Ka is increased (toward a value of 1) where the ATW (or MTW) is near to the ETW to ensure the MTW is favored in the ATW determination. In another example, Ka is set by default to a low value (e.g., about 0.0) automatically at the transition between zones having different crops or hybrid types to account for the variation in test weight (e.g., measured and estimated) between crops or hybrid types. Optionally, tiered thresholds (or a polynomial equation) based on the ETW are used by the controller 212 to escalate the gain (e.g., 20 percent difference between ATW/MTW from ETW, Ka=0.0; 15 percent difference, 0.25; 10 percent, 0.5; 5 percent, 0.9). Similarly, consistency in MTW values increases the gain (toward a value of 1) while inconsistency in MTW values decreases the gain (toward 0).

Optionally, the ATW determination also includes a geospatial test weight (GTW) and a corresponding gain Kg that varies according to the weight attributed to each of the MTW and the GTW.

$$ATW=Ka(MTW*Kg+GTW(1-Kg))+(1-Ka)ETW$$

In one example, each of the MTW and the GTW are compared with the ETW. If the GTW varies more from the ETW relative to the MTW the gain (Kg) increases (toward a value of 1) and MTW, as shown above, is accordingly weighted higher compared to GTW. Conversely, if the MTW varies more from the ETW relative to the GTW the gain (Kg) decreases (toward a value of 0) and GTW is accordingly weighted higher while MTW is weighted relatively lower.

Referring again to FIG. 2, according to further embodiments, the controller 212 communicates with modules or devices such as one or more of the GPS location module 218, the hybrid zone map 220, the hybrid database 222 or the memory device 234 to obtain data including but not limited to the location of the harvester in the field, the hybrid type corresponding to the location of the harvester in the field (e.g., within a zone). The controller 212 uses information from one or more of these sources to determine the one or more harvest characteristics such as the estimated test weight, the actual test weight, one or more aspects (a filter, a constant, a factor, a variable, or the like) related to the yield calculation, a calculation parameter related to a sensor (e.g., a particular algorithm used, a constant, error correction, statistical weight or the like). In other example embodiments, the controller 212 communicates with the memory device 234 to access stored information for use in yield calculations in each of a plurality of zones with corresponding hybrids. Stored data includes, but is not limited to, the arrangement and identification of a plurality of zones in a field, the hybrid type planted in each of the plurality of zones. Further, measured and derived information is stored in the memory device 234 for later access including, but not limited to, yield values in each of the plurality of zones, actual and measured test weights or the like. According to further embodiments, the systems including the controller 212 access the stored plurality of data to plan future seed prescriptions.

FIGS. 1 and 2 illustrate that the harvester (e.g., harvester 100) is located with GPS antenna 110 or other positioning technology in a field and uses the location along with measured values such as weight, volume moisture or the like to determine one or more values (e.g., yield, actual test weight or the like). The determined location of the harvester 100 corresponds with a zone having an associated crop (e.g., a hybrid type of a plurality of hybrids). As previously described the hybrids and indexing of the hybrid planted locations to zones are optionally stored in the hybrid zone map 220. The measures of weight, volume or other characteristics of the harvested crop are collected on an ongoing basis and inputs the measured values to the receiving and processing node 214. Ongoing measurements of one or more of these characteristics are taken by the sensors 202-210. Changes in location of the harvester 100 prompt corresponding changes in the associated zone, and where applicable (i.e., with transitions from one hybrid to another) change one or more elements (constants, estimated test weights or the like) associated with the hybrid of the instant zone. For example, the hybrid and associated characteristics of the hybrid (e.g., estimated test weight) are stored in the hybrid database 222. The hybrid database 222 is cross referenced to the hybrid zone map 220 or the hybrid zone map 220 includes indexed information for each zone, such as estimated test weights for the various hybrids. The actual test weights of the hybrid types are determined on an ongoing and continuing basis and differentiated according the zones. Stated another way, as the harvester 100 is present in a zone measured values for weight, volume or the like are married with the instant estimated test weight for the hybrid of the zone and used to determine yield, actual test weight or the like. As the harvester 100 transitions to another zone (detected with the GPS antenna 110 in one example) having a different hybrid the measured weight, volume or the like are married with updated information such as an estimated test weight for the different hybrid to provide enhanced precision and accuracy for yield, actual test weight or the like that is specific to the different hybrid. The location of the harvester 100, the corresponding zone the harvester 100 resides in, the hybrid type or crop associated with the zone, and the harvest characteristic(s) associated with the zone (e.g., estimated test weights, equations, constants in equations or the like) are updated as the harvester moves in field, for instance as the harvester 100 moves into zones with differing hybrids.

In one example, the harvest characteristic such as the estimated test weight of a hybrid associated with a zone is used as an input into various modules in addition to sensor data (e.g., from sensors 202-210). In the case of the moisture sensor 206, the estimated test weight is optionally used to check the accuracy of the moisture sensor 206 (or other sensors, such as the weight and volume sensors 202, 204) as the estimated test weight is a statistical average. If an actual test weight (e.g., based on a measured test weight and the estimated test weight, volume and moisture measurements taken by the system) varies beyond a specified threshold from the estimated test weight (e.g., plus or minus a percent value of the estimated test weight, such as 10 percent, 15 percent, 20 percent or the like) the detected variation is used to exclude or flag sensor data as possibly corrupted (e.g., by a faulty sensor). In other examples, the detected variation is used to graduate a gain (e.g., Ka as described herein) that increases or decreases the weight of the estimated test weight (static) and conversely decreases or increases the weight of the measured test weight (based on measured values), as described herein. For instance, if the actual test weight value varies significantly (plus or minus 15 percent) from the estimated test weight because of high or low measured test weight then the gain is decreased to accordingly increase the weight of the estimated test weight while decreasing the weight of the measured testing weight. Conversely, if the actual test weight is relatively near to the estimated test weight (plus or minus 5 percent) from the estimated test weight then the gain is increased to accordingly decrease the weight of the estimated test weight while increasing the weight of the measured test weight. The estimated test weight is thereby used as a base threshold for comparison with measured test weight and actual test weight, and one more of tiered thresholds (e.g., based on percentage deviation of the actual test weight/measured test weight from the estimated test weight) are used to graduate the gain. In other examples, the estimated test weight is used as the base threshold in a polynomial equation that varies the gain proportionally (including inversely proportional) to the deviation of the actual test weight (the deviation a function of measured test weight) from the estimated test weight.

As discussed previously, estimated test weight and updating of estimated test weight (e.g., during or triggered by transitions between zones by the harvester) allows for more rapid and accurate processing of data. The receiving and processing node 214 uses the estimated test weights assigned to each of the zones for the field to facilitate accurate and precise ongoing calculation of yield, final calculations of yield for a multi-zone field, determination of actual test weight for each of the zones or the like as described herein.

In one embodiment estimated test weight is used by the controller 212 to improve yield calculation accuracy by updating the estimated test weight used in yield calculations as the harvester 100 moves between zones with differing estimated test weights associated with the zones and the hybrids respectively therein. Corresponding measurements including volume, weight, moisture and temperature from harvested crops in the instant zone are thereby properly associated with the corresponding estimated test weight to ensure accurate yield values for each of the crops (e.g., various hybrids). Similarly, where the controller 212 determines actual test weight (as a function of estimated test weight and measured test weight/values) and performs yield calculations (using estimated or actual test weight) the estimated test weight for the associated hybrid or crop for is used to ensure accuracy in calculations of either or both of actual test weight and yield values.

In another example, as the harvester 100 transitions between first and second zones having respective first and second (differing) hybrids, the hybrid from the previous first zone continues moving through the harvester and is not immediately finished with processing at the zone transition. Instead, the hybrid finishes processing in the harvester 100 some distance and time beyond the zone transition. In this example, the controller 212 (e.g., yield monitor 238) continues to calculate actual test weight based on measured volume, weight, moisture and the previous (first zone) estimated test weight of the prior zone. The controller 212 then transitions to the estimated test weight of the instant zone (second zone) at a later time (and distance) from the zone transition for the harvester 100. In one example, when the value of the actual test weight (or measured test weight) varies beyond a threshold, such as plus or minus a percent of the previous first zone estimated test weight (e.g., 10, 15, 20 percent or the like) the controller 212 detects the change in hybrid and updates the estimated test weight used in yield calculations to the second estimated test weight of the second hybrid in the second zone. In another example, when the calculated actual test weight (or measured test weight) achieves a threshold value corresponding to the estimated test weight of the new second zone (e.g., within 5, 10, 15 percent or the like) the controller 212 detects the change in hybrid and updates the estimated test weight used in yield calculations to the estimated test weight of the second hybrid in the second zone. Previously measured values of weight, volume, moisture and the like that triggered the detectable variation in actual test weight are then retroactively married with the updated estimated test weight to provide yield values (and updated actual test weight where applicable) that are accurately based on the correct hybrid. Accordingly, measured volumes, weights, test weights (both actual and estimated) are compartmentalized to the appropriate zone and hybrid. Stated another way, measurements, test weights or the like associated with a first harvested hybrid (or crop) from a first zone are not improperly mixed with those of a second harvested hybrid (or crop) from a second zone.

By correlating the change in crop to a change in actual test weight, the transition is detected and accounted for providing more accurate yield data. Stated another way, data collection via one or more sensors 202-210 and processing via one or more of the weight flow module 224, the volume flow module 226, the moisture content module 228, the cutout level 230, and the blending filter 232 are changed at or near to the transition between the first and second zones based on the actual change in hybrid detected during measurements. This avoids smearing (e.g., jumbling) as measured values for the first hybrid and the second hybrid change after passage of the harvester 100 across the zone boundaries, and ensures enhanced data resolution. This allows for better filtering and packaging of data and avoids the smearing previously discussed. Further, changes in one or more harvest operations are optionally staggered in other examples. For instance, harvest operations including but not limited to header height, stripper width, cylinder/rotor clearance, cylinder/rotor speed, harvester ground speed, fan speed, reel height or the like are in one example immediately implemented at the transition between zones as the crop or hybrid type is immediately harvested (there is no delay for processing of the crop within the harvester). Conversely, other harvest operations including, but not limited to, updating of an estimated test weight for a second hybrid of a second zone, yield calculations, actual test weight calculation or the like are delayed in a manner as discussed herein (e.g., for processing through the harvester). For instance, the controller 212 implements the updating of the estimated test weight based on the comparison of the measured test weight (or actual test weight based on the measured test weight) to either or both of the previous and new estimated test weights.

FIG. 2 further shows the hybrid database 222 communicates with the controller 212 including one or more of the weight flow module 224, the volume flow module 226, the moisture content module 228 or the cutout level 230. Optionally, information on the hybrid is provided by the hybrid database 222 to the blending filter 232 (as the harvester 100 moves through a zone including the associated hybrid) as a target density (e.g., estimated test weight) for the calculation of one or more yield values including weight per second, volume per second, density per second, and bushels per second. For example, the estimate test weight is used in a weighted manner with volume and weight measurements and derived actual test weight (based on measured weight and volume) to adjust the yield values generated with the blending filter 232. In another example, the actual test weight is retroactively used with measured volume, weight or the like to update yield values previously determined based on the estimated test weight (e.g., immediately after transition across zones and before sufficient measured values are present to calculate the actual test weight).

According to the embodiment shown in FIG. 2, harvest characteristics, such as the estimated test weight for the hybrid of a zone, are used by various modules (e.g., modules 224-230 and the blending filter 232) in addition to measured values from the sensors 202-210. As the harvester transitions from a first hybrid to a second hybrid the crop moisture measured values, weight measured values, volume measured values or the like may change. Notification of the transition and the forthcoming change in one or more of crop moisture, weight, volume values or the like facilitates the immediate adjustment of calculations and values (such as expected moisture content, associated estimated test weight or the like) for one or more measurements of these characteristics (e.g., moisture, volume, weight or derived values based on these measurements such as actual test weight). In another example, the transition across zones is used to assign one or more thresholds for measurements of moisture, weight, volume or the like. For instance, the thresholds include (in examples) estimated characteristics for moisture, weight, volume or the like in a similar manner to the estimate test weight described herein. As the measurements approach or achieve the respective thresholds the corresponding values, equations or the like for the second hybrid (in the second zone) are used in ongoing and optionally retroactive (to the detected variation in value) measured values. Stated another way, algorithms, equations, constants, variables, factors, for the same are readily changed during (or after) the harvester 100 transition to a new zone to ensure accurate calculation of one or more characteristics including but not limited to moisture, volume, weight or actual test weight in real-time accurately based on the correct hybrid as it is measured. That is to say, estimated test weights, values, equations, constants, factors or the like for a previous first hybrid are not errantly used with a harvested and measured second hybrid. And conversely, the estimated test weights, values, equations, constants, factors or the like for a later second hybrid are not used with measuring and calculations for the first hybrid of a second zone that is still in process after the harvester 100 transitions into the second zone. Accordingly, the systems and methods described provide for accurate measurement, yield determination and the like of each hybrid (or crop) in a field based upon hybrid specific characteristics of the hybrids harvested in the field.

FIG. 3 illustrates a method according to an example embodiment. In general, the methods of FIGS. 3 to 5 may utilize components and techniques of the systems discussed in reference to FIGS. 1 and 2 (as well as FIGS. 6-11), therefore, specific discussion of hardware, software, databases, sensors, and other components used herein (e.g., in FIGS. 1, 2 and 6-11) is applicable to at least these figures.

The method 300 of FIG. 3 includes at 302, locating the harvester in the field such as by GPS, user input, or the like. The method further includes generating 304 a reference map showing locations of various hybrids within the field. The reference map (also called a harvest map herein) is created using hybrid information obtained during planting (e.g., planting locations for hybrids in zones of the filed based upon user input, bar code scanning, GPS, automated indexing of planter operations during planting or the like). At 306 the method 300 includes accessing a database or similar reference memory to determine hybrid specific characteristics (e.g., test weight, average yield, average moisture content, average weight, average volume, traits, and the like) of the instant hybrid type being harvested based upon the location information and the reference map. At 308, one or more models are developed based upon the hybrid specific characteristics. In one example, at 310 the one or more models alter one or more harvest operations based upon the hybrid specific characteristics for the hybrid type being harvested a location in the field (e.g., corresponding to one of a plurality of zones). For instance, the one or more models are implemented to change one or more operations of the harvester for optimization of harvesting based upon the hybrid specific characteristics for the specific hybrid type harvested in a respective zone of the field. In another example, the one or more models additionally (or alternatively) optimize processing of and the gathering of real-time crop information (e.g., one or more of actual test weight, volume, weight, moisture content, yield or the like as described herein) by way of one or more sensors on the harvester as well as modules, the controller 212 or the like (see e.g., FIG. 2) based upon the hybrid specific characteristics of the hybrid types harvested at respective zones in the field.

FIG. 4 illustrates another method 400 according to disclosed embodiments. The method 400, implemented in one example by the controller 212, adjusts harvest characteristics by selecting one or more harvest characteristics according to the location of a harvester within a field. For example, the method 400 includes at 402 determining the location of the harvester within the field and at 404. The method 400 further includes associating or indexing the harvester location with a corresponding zone of a plurality of zones in the field according to one example. As described herein each of the plurality of zones corresponds to a respective crop planted within the field (for instance a hybrid type). At 406, the method 400 includes assigning one or more harvest characteristics (e.g., to an algorithm such as a yield equation, harvester operation such as cutting height or the like) to dictate a harvest operation according to at least the corresponding zone and the respective crop within the corresponding zone. At 408, harvest operations, such as one or more of ground speed, width of stripper/deck plates, cylinder/rotor clearance, cylinder/rotor speed, opening or closing of sieves, fan/blower speed, header height, a reel height of the harvester or the like, are conducted according to the assigned one or more harvest characteristics. At 410, the systems and methods described herein repeat assignment of the one or more harvest characteristics as the harvester changes location within the field (e.g., passes from one zone to another with differing assigned characteristics) as described herein.

According to further examples, the method 400 further includes generating a planting map (e.g., during planting) that includes at least first and second zones of the plurality of zones corresponding to first and second respective crops (including hybrids). The one or more harvest characteristics include at least a first harvest characteristic (such as one or more of an estimated test weight, equation, constant, factor or the like as described herein) for the first respective crop and a second harvest characteristic (such as one or more of an estimated test weight, equation, constant, factor or the like) for the second respective crop. The method assigns one or more harvest characteristics to control the harvest operation (including actual harvesting operations, measurement and calculation or the like) according to at least the corresponding zone. For example, the assignment of the one or more harvest characteristics according to zone assigns one or more first harvest characteristics while the harvester is in the first zone, and assigns one or more second harvest characteristics while the harvester is in the second zone. In further embodiments, the method 400 harvest operations include calculating a yield. For example, with the harvester in the first zone, yield is calculated with one or more of the first harvest characteristics based on first hybrid associated with the first zone. Similarly, with the harvester in the second zone, yield is calculated with one or more of the second harvest characteristics associated with a different second hybrid associated with the second zone.

Additional embodiments of the method 400 conduct harvest operations including mechanical harvesting, processing of the crop within the harvester 100 or the like based on the assigned harvest characteristics. For instance, with the harvester in a first zone having a first crop (e.g., hybrid) the harvester 100 harvests the first respective crop according to harvest characteristics and harvest operations associated with the harvest characteristics including one or more of first operational instructions or settings such as ground speed, width of stripper/deck plates, cylinder/rotor clearance, cylinder/rotor speed, opening or closing of sieves, fan/blower speed, header height, reel height of the harvester or the like). Similarly, with the harvester in the second zone the harvest characteristics associated with the second zone correspondingly control harvest operations such as second operational instructions or settings (e.g., including one or more of ground speed, width of stripper/deck plates, cylinder/rotor clearance, cylinder/rotor speed, opening or closing of sieves, fan/blower speed, header height reel height of the harvester or the like). That is to say, in addition or alternatively to adjusting yield, measurements or the like as described herein, in another example, assigned harvest characteristics including crop type (e.g., hybrid type) for respective zones are used to adjust actual harvester operation to ensure the best harvester configuration for the instant crop (e.g., hybrid)

In other embodiments, at least one harvest characteristic of the one or more harvest characteristics is updated on a continuous (e.g., recurring, frequent, interval, updated or the like) basis. Updating optionally includes one or more of measuring at least one characteristic (e.g., moisture content, weight, volume, temperature) of the crop in its corresponding zone, calculating an updated harvest characteristic (e.g., actual test weight) for the harvested crop, and changing the at least one harvest characteristic to the updated harvest characteristic. For instance, as described herein when the transition occurs within the harvester 100 from a first crop to a second crop (e.g., from first to second hybrids sometime after a zone transition) in some examples a previously assigned estimated test weight, actual test weight, or the like is retroactively changed to an updated value, such as an estimated test weight for a second zone, and previously calculated values such as yield are correspondingly updated to account for the updated estimated test weight. In other examples, as measured or derived values of a characteristic accrue into a statistically significant sample size the controller 212 optionally updates equations, constants, factors or the like in an ongoing manner (and optionally retroactively) with updated values to provide more accurate and precise measurements and derived values. One example, of updating of a characteristic includes updating the actual test weight in a yield calculation as the number of measurements of volume, weight, moisture and the like accrue within a zone. According to further embodiments, the one or more harvest characteristics comprise one or more of an estimated test weight, an actual test weight, one or more aspects related to a yield calculation, a parameter or calculation related to a sensor, and a harvester operation.

According to one embodiment, the harvested crop includes two or more hybrid types. As discussed herein, one or more harvest characteristics are assigned to the system, for instance the controller 212, control harvest operation (including multiple operations) while the harvester is in a zone including one of the two or more hybrid types. In one example, the assignment of harvest characteristics are indexed to the zones by generation of a planting map that assigns at least a hybrid type of the two or more hybrid types to each zone of a plurality of zones. In another example, the method 400 assigns an estimated test weight to each zone of the plurality of zones of the planting map based on the hybrid type assigned. The controller 212 implementing the method 400 selects one or more harvest characteristics based on the harvester location in the field. For instance, the controller 212 selects the estimated test weight for the hybrid type associated with the zone including the harvester therein. With the selected harvest characteristic, the controller 212 conducts a yield calculation (e.g., with the yield monitor 238) based upon the selected estimated test weight and one or more sensed values (described herein).

According to further embodiments, the yield calculation for the yield monitor 238 is performed manually or automatically based upon a planting identifier (e.g., a bar code scanned during planting).

Further example embodiments determine an actual test weight (a measure of the density of the crop accounting for factors such as the moisture content, the temperature of the crop, or the like) according to the location of the harvester in the field based upon the estimated test weight (e.g., a statistical average based upon a historical average for the corresponding hybrid type) corresponding to which of the plurality of zones the harvester is located in and further based upon a measured test weight (e.g., based only upon a measured weight and a measured volume, and in some cases a moisture content) as measured by one or more instruments on the harvester (as described herein below). According to some examples, the method 400 changes one or more aspects of a calculation of the measured test weight based upon the harvester location and the hybrid type associated with that location (e.g., associated with a corresponding zone in the field). The one or more aspects comprise one or more calculation parameters related to moisture sensor data according to a further embodiment.

In some embodiments, the method 400 includes generating a planting map during a planting operation before conducting the harvest operation. The planting map includes one or more harvest characteristics associated with each zone of the plurality of zones (e.g., hybrid type, estimated test weight or the like). Generating the planting map includes at least one of manually generating (hand or graphically entering harvest characteristic information onto a map) or automatically generating the planting map (e.g., through indexing of planted hybrids based on GPS logging of a planter operation within a field) in some embodiments.

In some cases, the method 400 includes storing a plurality of information associated with the plurality of harvest characteristics. Such information can include, for example, the location in the field, the hybrid type corresponding to that location in the field, and an average expected yield from associated with the hybrid type used. Such average expected yield can be used in planning future seed prescriptions as is discussed further below. The method generates a yield for each hybrid type in the field according to further embodiments. Such yield can be updated in real-time in some cases. In other embodiments, the yield can be the expected yield. The method assigns the yield to a planting map to display the yield for each hybrid type at the corresponding zones in the field in some cases. The planting map including the hybrid type, yield of the associated harvested hybrid type, or the like for each zone (e.g., a harvest map) is optionally used to plan future plantings, husbandry such as a fertilizing, watering or the like.

FIG. 5 illustrates a method 500 for determining a test weight (e.g., actual test weight as described herein) of a crop for yield calculations according to another example embodiment. According to the example embodiment, at 502 the location of a harvester within the field is identified. At 504 the location of the harvester is associated with a corresponding zone of a plurality of zones. As described herein each of the zones includes an assigned hybrid and an assigned estimated test weight corresponding to the assigned hybrid. At 506 the estimated test weight, corresponding to the harvester location in a zone, is assigned, for instance to the controller 212, yield monitor 238 (associated with the controller) or the like. The method 500 includes at 508 conducting harvest operations (e.g., as described in reference to FIG. 4) according to the assigned estimated test weight. At 510 the method 500 includes repeating assignment of the estimated test weight as the harvester changes location within the field. For instance, as the harvester transitions into a zone having a different assigned estimated test weight, the estimated test weight used by the controller 212 (e.g., the yield monitor 238) is updated to the different estimated test weight.

In further embodiments, the method 500 determines the actual test weight (a measure of the density of the crop accounting for factors such as the moisture content, the temperature of the crop, or the like) according to the location of the harvester in the field based upon the estimated test weight (e.g., a statistical average based upon a historical average for the corresponding hybrid type) for the zone in which the harvester is located and further based upon a measured test weight gathered in the zone in which the harvester is located. Thus, the method 500 includes using the estimated test weight as an input for calculation of the actual test weight in some embodiments. In some cases, the actual test weight includes measuring a volume, a moisture content, and a temperature of the crop during harvest. These features are input in the controller 212 and a feature such as the blending filter 232 calculates the actual test weight based upon the measured volume, the moisture content, and the temperature of the crop. In some cases, the method 500 changes one or more aspects of a calculation of the measured test weight (e.g., based only upon a measured weight and a measured volume, and in some cases a moisture content) based upon the hybrid type according to the location of the harvester in the field. In other embodiments, the method conducts a yield calculation for the yield monitor 238 based upon the actual test weight. In other embodiments, the assigned hybrid is referenced prior to determining the measured volume, the moisture content, and the temperature of the crop.

As described herein, once a hybrid change is detected based upon the harvester location relative to the zones on a reference map (e.g., previously generated planting map) the yield monitor 238 uses map information to input the change to existing yield monitor solutions. Thus, if volume of grain is calculated by using the weight and density (e.g., test weight) associated with the presently harvested hybrid, the accuracy of grain volume calculations improves relative to a test weight used throughout a field. In further examples, the change in zones triggers the controller 212 to use the to-be-updated estimated test weight as a threshold, and compares actual test weight or measured test weight values with the threshold test weight. When the threshold is met (e.g., when the actual or measured test weight approaches or reaches a value corresponding to the threshold) the controller 212 transitions to the updated test weight (previously the to-be-updated value) and conducts yield calculations in an ongoing (and optionally retroactive fashion) with the updated test weight.

According to further embodiments, the hybrid change based upon the harvester location relative to a reference map (e.g., plotted with zones having corresponding hybrids and other characteristics as described herein) is used as an input to tune existing yield algorithms (with updated constants) or the like. Using the change in hybrid type as an input into the existing yield algorithms allows for further refinement of the yield equation. In some cases, the hybrid change based upon the harvester location relative to a reference map (e.g., plotted with zones having corresponding hybrids and other characteristics as described herein) is used This information could be used as a "reference" or "base" for future yield algorithms designed to measure test weight and other/or harvest characteristics.

According to further embodiments, the hybrid change based upon the harvester location and the reference map is used to change at least one of an input and the yield calculation used for the respective hybrids. For example, the systems and methods may include different yield algorithms for each hybrid such that a hybrid change between zones also includes associated and different algorithms for each hybrid or crop. Therefore, as the harvester changes locations the change in hybrid type changes the yield algorithm. In other embodiments, each hybrid comprises an input into a common algorithm of the yield calculation and input is updated as the harvester changes location.

Accordingly, when a change in hybrid is detected (e.g., the harvester 100 moves between zones with differing hybrids) the controller changes the yield monitor algorithm to the algorithm associated with the hybrid currently harvested. According to yet other embodiments, the hybrid change based upon the harvester location and the reference map is used in hybrid tracking. Records of one or more of the hybrid type, test weight, and other information about the hybrid are output (e.g., to a monitor, memory, connected system whether wired or wireless or the like). In some embodiments, these records (e.g., the test weight, hybrid type, or other data) are exported to grain tracking systems including, but not limited to grain cart load tracking systems or the like.

According to some examples, the disclosed systems and methods change the estimated test weight input into a yield monitor to the actual test weight input based on "as applied" planter hybrid information. That is to say, the estimated test weight is replaced (e.g., after determination of an actual test weight) in yield calculations by the determined actual test weight for the corresponding hybrid to improve yield accuracy and account for errors otherwise caused by sudden changes in estimated test weight when switching hybrids at zone transitions but before processing of the new hybrid by the harvester (e.g., before it reaches the sensors 202-210). By correlating the change in hybrid to a change in test weight (instead of the location of the zone transition), the hybrid change and its associated test weight is accurately logged with the actual harvested corresponding hybrid (e.g., some delayed time after crossing into the next zone) to provide more accurate yield values. Stated another way, the systems and methods described herein correlate test weight used in yield calculations to the hybrid type actually harvested. This correlation allows the test weight or some other harvest characteristic used for the yield monitor to change and accurately associate the crop (e.g., crop or hybrid type) presently harvested and measured. This provides for increased accuracy with respect to the actual test weight determination and corresponding increased accuracy with respect to yield calculations.

Figure 6:
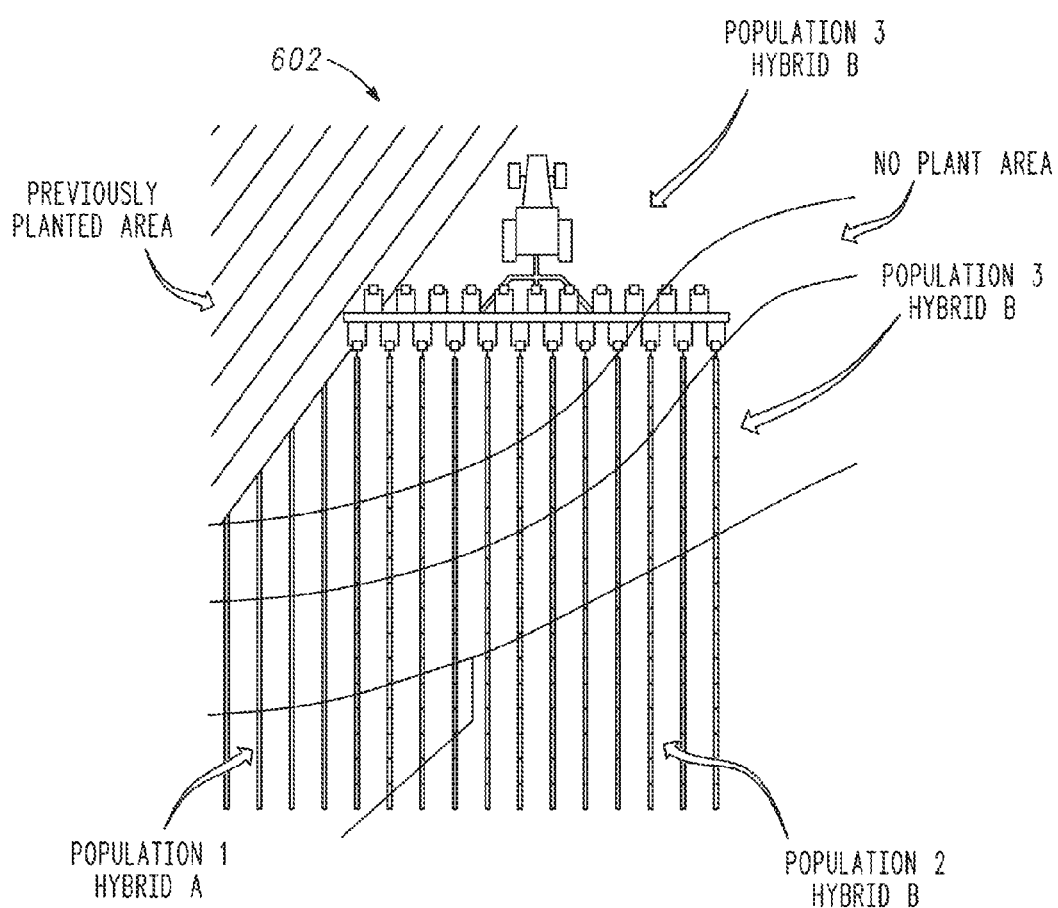
FIG. 6 is a schematic view of one example of generation of a map during planting of various hybrids in a field.

FIG. 6 provides a plot of a field and an overlaid planting map 602 generated during planting of various hybrids in the field. The planting map 602 serves as the basis for a harvest map or a hybrid zone map 220 of FIG. 2 according to some embodiments. In one example, the planting map 602 is generated by manually plotting zones in a field and indexing the hybrid type planted for each zone, for example. According to other embodiments, the planting map 602 is generated automatically at planting, for instance by logging planting of various hybrids according to operation of a planter indexed to the location of the planter during planting. Information on the planted hybrids is provided to either of manual or automatic systems by scanning bar codes or other indicia of the hybrid planted and then indexing the hybrid identifier to each zone (whether manually or automatically). This planting map 602 is used as the basis for a harvest map generated while harvesting, i.e., including yield values associated with zones/hybrids, according to some examples.

FIG. 7 shows a harvest map 702 including a plurality of zones 704A. 704B, 704C (further zones not specifically numbered for ease of reference). Each of the zones is associated with a particular hybrid type 706A, 706B, 706C (further hybrid types not numbered for ease of reference) of a plurality of hybrid types used in the field. The harvest map 702 corresponds to the hybrid zone map 220 of FIG. 2 according to some embodiments.

The harvest map 702, as described herein, is used as a reference map to dynamically change harvest characteristics according to movement of the harvester through the various zones 704A-C as previously discussed with reference to FIGS. 1 and 2. The harvest map 702 includes different crops including different hybrid types (e.g., 706A, 706B, 706C) of the same crop hybrid. Harvest characteristics associated with the hybrid types 706A, 706B. 706C including one or more of estimated test weights, algorithms, equations, constants or the like vary between hybrids and the differing characteristics are keyed to the hybrids on the map 702. As harvester moves through field during harvest, a controller (e.g., controller 112 or controller 212) updates the harvest characteristics according to the hybrid type in that zone. In some examples, real-time measurement or derivation of weight, volume, actual and measured test weight, and the like are conducted as the harvester moves in the field. The models (algorithm used to measure weights, volumes, moisture, yield or the like) and characteristics (such as estimated test weight) that generate these measurements or values are updated as the harvester moves into zones with differing characteristics to ensure accurate and precise hybrid specific harvesting and yield determination.

FIG. 8 is an illustration of an embodiment of a database 802 that is utilized with the systems and methods disclosed herein. For example, the database 802 is with the systems of FIGS. 1 and 2 or the methods 300, 400, 500 of FIG. 3, 4, or 5. For example, the database 802 comprises the hybrid database 222 of FIG. 2 according to one embodiment. The database 802 includes estimates of hybrid specific information including, but not limited to, estimated test weight 804, estimated yield 806 based upon crop type (e.g., hybrid type), traits 808, variability, and the like. In particular, the database 802 is in the form of a table that tabulates the estimated test weight 804 for each hybrid type 810. As discussed herein, the estimated test weight 804 is a statistical average based upon historical average test weights for each hybrid type 810. According to some embodiments, the estimated test weight 804 additionally or alternatively is generated or altered according to environmental conditions (e.g., drought), geographical location, operator input (e.g., anecdotal experience with the hybrid type) or from test harvests.

FIG. 9 illustrates a further database 902 according to an example embodiment. Similar to the database of FIG. 8, the database of FIG. 9 the database 902 is used with the systems of FIGS. 1 and 2 or the methods of FIG. 3, 4, or 5 to associate particular zones 904 with associated hybrid types and harvest characteristics. In operation, as the harvester moves across the field from zone 904 (e.g., $Z_1$) to zone 904 (e.g., $Z_2$), the hybrid type associated with the corresponding zone is updated as necessary. Additionally, harvest characteristics associated with the particular zone 904 the harvester resides are referenced to the database 902. The database 902 is organized as a table and illustrates the field divided into a plurality of zones 904. Each of the zones 904 includes a particular hybrid type. Harvest characteristics associated with each hybrid type are provided in the database including an estimated weight 906 (as a rate of pounds mass per second), estimated volume 908 (as a rate of cubic inches per second), estimated test weight 910 (e.g., in units of mass per unit volume such as kilograms per bushel, kilogram per cubic meter or the like), estimated yield 912 or the like. According to some embodiments the database 902 includes harvest operations (i.e. operational parameters for the harvester) such as a desired harvest rate (e.g., bushels per second) or the like. In some example, the test weight (estimated or measured) affects the calculation of the volume 908 and the weight 906 as well as the yield 912 shown in the table. The estimated test weight 910 is used in calculation of the moisture content 914 according to some embodiments.

In one embodiment, the estimated test weight 910 (e.g., a database value that is a statistical average based upon a historical average for the applicable hybrid type being harvested) and other data specific to the hybrid type being harvested in a particular zone are used in combination with measured values such as one or more of volume, weight or the like to determine an actual test weights for each of the respective hybrids. According to one example, the actual test weight is calculated with sensor information gathered contemporaneously with harvesting (e.g., one or more of volume, weight, moisture, temperature measurements or the like). The systems and methods described herein (e.g., the controller 212) determine the actual test weight for each hybrid according to the location of the harvester in the field and the associated estimated test weight for the hybrid within the corresponding zone. Further, the systems and methods described herein determine the actual test weight based upon a measured (e.g. sensed) test weight determined with values obtained by the one or more sensors on the harvester (e.g., weight, volume or the like). One example of the determination of actual test weight is further detailed in reference to FIGS. 1 and 2 above. As the harvester travels across the field it transitions from a first zone having a first hybrid planted therein to a second zone having a second hybrid planted therein. Data collection and processing techniques are changed at the transition between the first zone and the second zone. This avoids smearing (e.g., jumbling) of data from the first hybrid and the second hybrid together, and thereby, allows for better data resolution. This is important such as in situations when the first hybrid has an estimated test weight that is 10% higher than the estimated test weight of the second hybrid. Knowing this information, the location of the harvester in the field and the location of the change between the first hybrid and the second hybrid, the calculation of actual test weight becomes more accurate. Thus, when the harvester crosses zones from the first hybrid to the second hybrid, a step change in test weight is expected. Knowing this, calculation of the actual test weight of the first hybrid ceases and a new calculation of the actual test weight of the second hybrid begins at the transition between zones allowing for better filtering and packaging (compartmentalizing) of data, and avoiding the smearing discussed previously. According to further examples, estimated test weight is used in the calculation of actual test weight as a way of identifying statistically relevant deviations from the historical range. Such deviations are flagged as possible measurement errors or as other statistically significant events.

As shown in FIG. 10, information that can be used with the disclosed systems and methods extends beyond calculation of test weight and yield such as to aspects of the harvester operation. FIG. 10 shows a further database 1002 according to an example embodiment. The database is organized as a table and illustrates the field divided into a plurality of zones with a hybrid type 1006 associated therewith. In the embodiment of FIG. 10, each zone has harvest operations 1004 (i.e. harvester operational characteristics) associated therewith including, but not limited to, stripper/deck plate settings 1008, cylinder/rotor clearance 1010, cylinder/rotor speed 1012, opening or closing of sieves, fan/blower speed 1014, header height, reel height 1016 harvester ground speed 1018 or the like. For example, with regard to the stripper/deck plates on the head, first and second hybrids with different ear sizes (e.g., hybrid variety $H_1$ with smaller ears than hybrid variety $H_2$) prompt a change of the width of the stripper/deck plates to ensure the ears of each hybrid are properly stripped and captured. The detected transition of the harvester 100 between zones with the two hybrids triggers this change. Cylinder/rotor clearance is also dependent on ear size. If clearance is too tight corn is ground and damages the crop. In contrast, if the clearance is large for the ears corn cobs with kernels still affixed thereon are delivered from the rotor.

With regard to cylinder/rotor speed 1012, speeding up the cylinder is similar to closing the cylinder clearance. However, the speed of the cylinder/rotor is more closely related to the how easy it is for kernel to separate from the cob with corn. In corn, different hybrid types separate from the cob more easily while others are harder to thrash. In soybeans, an increase in speed of the cylinder/rotor relative to corn is desirable to prevent plugging the combine.

Sieves are opened or closed depending on various factors including grain size (e.g., kernel size), grain loss (e.g., sensed kernels dropping from the header or return elevator), or the like. According to some embodiments, adjustment of the sieves occurs during operation of the harvester and can be done on a zone by zone basis. Furthermore, it is desirable to have automatic adjustment (e.g., controlled opening or closing) of the sieves depending upon the location of the harvester and the hybrid type applicable in that location. Regarding fan/blower speed 1014, if test weight changes in some examples it (e.g., at a transition between zones) triggers a change in the fan speed in a manner similar to other harvester operations (described herein). A higher test weight (e.g., density) facilitates an increased fan speed to blow more husks, silk, leaves or the like and still not lose grain (e.g., soybeans, corn kernels or the like). Thus, if a hybrid change occurs, for instance at a transition between zones, changing the fan/blower speed is advantageous to optimize harvesting operation.

The header height is optionally adjusted as different hybrid varieties of corn include ears at different elevations relative to the ground. For example, hybrid variety $H_3$ includes ears close to the ground relative to variety $H_4$ (having ears at an elevator position). As the harvester 100 transitions between zones including the respective hybrids the location of the harvester 100 relative to the zones prompts raising and lower of the head height to ensure all ears of corn for each hybrid are cut and delivered into the harvester. Stated another way, the system 212 lowers the head for variety $H_3$ and raises the head height for variety $H_4$. In another example, with soybeans or wheat, reel height 1016 is also changed depending on height. Bean/wheat height changes according to the hybrid type and the controller 212 changes the reel height accordingly based on the transition of the harvester 100 between zones having differing hybrids.

As discussed, the gathering or processing of sensor data are negatively impacted if a single test weight is uniformly assumed. For example, if the harvester is operated at a uniform speed based upon the assumption of a single test weight (e.g., the assumption of a single crop type or single hybrid type) such operation is in some examples less than optimal (the crop is harvested too quickly and damaged or crops are left in the field, or the harvester moves slowly and could be operated quickly while still harvesting all of the crop) as test weight (density) varies according to hybrid type and crop type. Stated another way, the speed of the harvester may be too high in zones of the field where the test weight (density) for a first hybrid type is high (relative to lower test weight crops or hybrids) and too low in zones of the field where the test weight (density) for a second hybrid type low (relative to higher test weight crops or hybrids). The systems and methods described herein identify changes in one or more harvest characteristics including one or more of estimated test weight, actual test weight, one or more aspects related to yield calculation, parameter or calculation related to a sensor and update the operation of the harvester (including mechanical harvester operation, sensing of various characteristics, calculation of yield and other derived characteristics or the like) according to the location of the harvester within a zone having an associated hybrid type. For example, as the harvester travels across the field it transitions from a first zone having a first hybrid planted therein to a second zone having a second hybrid planted therein.

Values gathered by a sensor (e.g., a moisture sensor, a volume sensor, or a weight sensor) is converted according to the particular crop and hybrid type to ensure accurate measurement of crop moisture, weight, volume, yield, actual test weight or the like. As the harvester transitions between zones and the first hybrid changes to the second hybrid, one or more of measurements for crop moisture, weight, volume, or the like changes. The controller 212 detects the transition between zones having associated differing hybrids. Accordingly, as the change in crop moisture, weight, volume, or the like is occurring (or will occur after travel through the harvester mechanisms), models (equations, algorithms, constants in the same or the like) governing the calculation of the moisture, the volume, the weight, or the like change based on the updated hybrid to ensure accuracy in calculating the moisture, the volume, the weight, or the like of the crop in real-time. Thus, the systems and methods described herein provide for adaptive modeling (measurement, calculation of derived characteristics such as yield, actual test weight or the like) based upon the hybrid specific characteristics of the hybrids harvested within zones of a field.

The systems and methods recognize that harvest operation associated with the one or more harvest characteristics change according to variations of the hybrid type or crop planted in the field. With regard to harvest operations, the systems and methods described herein (e.g., with the controller 212) change one or more of the harvest operations including, but not limited to, ground speed, width of stripper/deck plates, cylinder/rotor clearance, cylinder/rotor speed, opening or closing of sieves, fan/blower speed, header height, reel height of the harvester or the like according to the location of the harvester 100 within zones having different hybrid types or crops (e.g., within zones that are indexed with the planted hybrid types).

FIG. 11 illustrates that in further embodiments, one or more harvest characteristics are organized in a database 1102. Such harvest characteristics include, but are not limited to, an estimated test weight 1104, an actual test weight 1106, one or more values, equations, factors or the like related to a yield calculation (e.g., a filter threshold, a constant 1108, a factor 1110, a variable S12 or the like), a parameter or calculation related to a sensor 1114 (e.g., one or more of the sensors 202-210 described herein). As described herein, in an example, these harvest characteristics are input (updated, maintained, used or the like) by the controller 212 according to the location of the harvester within zones 1116 including hybrid types 1118 (e.g., various hybrid types, crops or the like).

As shown in the embodiment of FIG. 11, each zone 1116 is associated with a hybrid type 1118, a corresponding estimated test weight 1104, an actual test weight 1106, a yield constant 1108, a yield factor 1110, a variable related to yield 1112 and a parameter or calculation related to a sensor 1114. In one example, one or more of the characteristics for each zone 1116 (e.g., estimated test weight, yield constant or the like) correspond to characteristics of the hybrid associated with the zone.

Additionally, the systems and methods described herein, in other examples provide record keeping functions in addition to harvest related operations. For example, the systems and methods include a planting map that is generated during a planting operation before conducting the harvest operation. According to one example, the planting map includes the one or more harvest characteristics associated with each zone of the plurality of zones. The planting map is manually generated or automatically generated using an identifier such as a bar code to first identify the seeds planted (e.g. two or more hybrid types) and then a plot of the hybrid types and corresponding zones according to actual planting is undertaken, for instance during planting operations at the beginning of the growing season.

According to further examples, the systems and methods store values (e.g., measurements, values, constants or the like) associated with the plurality of harvest characteristics, the location in the field, the hybrid type corresponding to that location in the field, and yield values (e.g., for each hybrid type generally, on a per zone basis or the like) as a harvest map. That is to say, values including, but not limited to, yield values, actual test weights or the like are stored (e.g., on one or more of a per zone, per hybrid or crop basis or the like) and optionally plotted to the planting map to generate a harvest map. The stored information is used, analyzed or implemented, for instance in planning future seed prescriptions including, but not limited to, assigning crops or hybrid types to zones, husbandry of crops or hybrid types or the like. Additionally, the systems and method described herein are readily configured to calculate one or more of yield on a hybrid type basis; yield for each zone of a planting map (and input the yield to the planting map for a harvest map); actual test weight for each of the harvested hybrids or crops, for each zone, or the like; a moisture content for each of the harvested hybrids or crops, for each zone or the like. These values are optionally stored and displayed to the operator or other personnel during or following the harvest, stored for future use and analysis or the like.

VARIOUS NOTES & EXAMPLES

Example 1 can include subject matter (such as an apparatus, a method, a means for performing acts, or a machine readable medium including instructions that, when performed by the machine, that can cause the machine to perform acts), such as a method for adjusting harvest characteristics can include selecting one or more harvest characteristics according to the location of a harvester within a field including determining the location of the harvester within the field, associating the location with a corresponding zone of a plurality of zones in the field, each of the plurality of zones corresponds to a respective crop planted within the field, assigning one or more harvest characteristics to a harvest operation according to at least the corresponding zone and the respective crop within the corresponding zone. The method can also include conducting the harvest operation with the assigned one or more harvest characteristics and repeating selecting the one or more harvest characteristics as the harvester changes location within the field.

Example 2 can include, or can optionally be combined with the subject matter of Example 1, to optionally further include generating a planting map that includes at least first and second zones of the plurality of zones corresponding to first and second respective crops, and the one or more harvest characteristics include at least a first harvest characteristic for the first respective crop and a second harvest characteristic for the second respective crop and assigning one or more harvest characteristics to the harvest operation according to at least the corresponding zone. The assigning of one or more harvest characteristics to the harvest operation can optionally include assigning the first harvest characteristic with the harvester in the first zone, and assigning the second harvest characteristic with the harvester in the second zone.

Example 3 can include, or can optionally be combined with the subject matter of one or any combination of Examples 1-2 to optionally include conducting the harvest operation includes calculating yield, and with the harvester in the first zone yield is calculated with the first harvest characteristic, and with the harvester in the second zone yield is calculated with the second harvest characteristic.

Example 4 can include, or can optionally be combined with the subject matter of one or any combination of Examples 1-3 to optionally include The method of claim 2, wherein conducting the harvest operation includes harvesting with the harvester, and with the harvester in the first zone the harvester harvests the first respective crop according to the first harvest characteristic, and with the harvester in the second zone the harvester harvests the second respective crop according to the second harvest characteristic.

Example 5 can include, or can optionally be combined with the subject matter of one or any combination of Examples 1-4 to optionally include updating at least one harvest characteristic of the one or more harvest characteristics including measuring at least one property of the respective crop of the corresponding zone, calculating at least one updated harvest characteristic for the respective crop, and changing the at least one harvest characteristic to the updated harvest characteristic.

Example 6 can include, or can optionally be combined with the subject matter of one or any combination of Examples 1-5 to optionally include the one or more harvest characteristics comprise one or more of an estimated test weight, an actual test weight, one or more aspects related to a yield calculation, a parameter or calculation related to a sensor, and a harvester operation.

Example 7 can include, or can optionally be combined with the subject matter of one or any combination of Examples 1-6 to optionally include the crop comprises two or more hybrid types, and assigning one or more harvest characteristics to a harvest operation according to at least the corresponding zone and the respective crop within the corresponding zone includes generating a planting map that assigns each of the plurality of zones with a hybrid type of the two or more hybrid types; and assigning an estimated test weight to each zone of the plurality of zones of the planting map according to the assigned hybrid type of that zone.

Example 8 can include, or can optionally be combined with the subject matter of one or any combination of Examples 1-7 to optionally include wherein selecting one or more harvest characteristics according to the location of the harvester in the field includes selecting the estimated test weight corresponding to the assigned hybrid type based on the location of the harvester in the field and the corresponding zone.

Example 9 can include, or can optionally be combined with the subject matter of one or any combination of Examples 1-8 to optionally include conducting a yield calculation for a yield monitor based upon the selected estimated test weight.

Example 10 can include, or can optionally be combined with the subject matter of one or any combination of Examples 1-9 to optionally include wherein the yield calculation for the yield monitor is performed manually or automatically based upon a planting identifier.

Example 11 can include, or can optionally be combined with the subject matter of one or any combination of Examples 1-10 to optionally include wherein the estimated test weight for each of the two or more hybrid types comprises a statistical average based upon a historical average for each hybrid type.

Example 12 can include, or can optionally be combined with the subject matter of one or any combination of Examples 1-11 to optionally include determining an actual test weight according to the location of the harvester in the field based upon the estimated test weight corresponding to which of the plurality of zones the harvester is located in and further based upon a measured test weight as measured by one or more instruments on the harvester.

Example 13 can include, or can optionally be combined with the subject matter of one or any combination of Examples 1-12 to optionally include changing one or more aspects of a calculation of the measured test weight based upon the hybrid type according to the location of the harvester in the field.

Example 14 can include, or can optionally be combined with the subject matter of one or any combination of Examples 1-13 to optionally include wherein the one or more aspects comprise one or more calculation parameters related to moisture sensor data.

Example 15 can include, or can optionally be combined with the subject matter of one or any combination of Examples 1-14 to optionally include generating a planting map during a planting operation before conducting the harvest operation, and the planting map includes the one or more harvest characteristics associated with each zone of the plurality of zones.

Example 16 can include, or can optionally be combined with the subject matter of one or any combination of Examples 1-15 to optionally include generating the planting map includes at least one of manually generating or automatically generating the planting map.

Example 17 can include, or can optionally be combined with the subject matter of one or any combination of Examples 1-16 to optionally include storing a plurality of data associated with the plurality of harvest characteristics, the location in the field, the hybrid type corresponding to that location in the field, and a yield from which the data is used, measured, or implemented including in planning future seed prescriptions.

Example 18 can include, or can optionally be combined with the subject matter of one or any combination of Examples 1-17 to optionally include generating a yield for each hybrid type in the field.

Example 19 can include, or can optionally be combined with the subject matter of one or any combination of Examples 1-18 to optionally include assigning the yield to a planting map to display the yield for each hybrid type at the corresponding zones in the field.

Example 20 can include, or can optionally be combined with the subject matter of one or any combination of Examples 1-19 to optionally include wherein the crop comprises two or more hybrid types, and further comprising calculating one or more of a yield per each of the two or more of hybrid types, a yield per zone with reference to a planting map, an average actual test weight per hybrid per each of the two or more of hybrid types, a moisture content per each of the two or more of hybrid types, a yield per location in the field, an average test weight per location in the field, and a moisture content per location in the field.

Example 21 can include subject matter (such as an apparatus, a method, a means for performing acts, or a machine readable medium including instructions that, when performed by the machine, that can cause the machine to perform acts), such as a method for determining a test weight of a crop for yield calculations. The method can optionally include determining a location of a harvester within the field, associating the location of the harvester with a corresponding zone of a plurality of zones, each of the zones having an assigned hybrid and a corresponding assigned estimated test weight associated with the assigned hybrid, selecting the assigned estimated test weight based upon the location of the harvester in the field according to the corresponding zone, conducting harvest operation according to the assigned estimated test weight, and repeating selecting of the estimated test weight as the harvester changes location within the field.

Example 22 can include, or can optionally be combined with the subject matter of Example 21 to optionally include wherein the step of associating the location of the harvester with a corresponding zone of a plurality of zones includes assigning an estimated test weight for each hybrid type of a crop within a field, and dividing the field into a plurality of zones based upon the hybrid type such that each zone has a corresponding hybrid type with an associated estimated test weight Example 23 can include, or can optionally be combined with the subject matter of one or any combination of Examples 21-22 to optionally include the estimated test weight comprises a statistical average based upon a historical average for each hybrid type.

Example 24 can include, or can optionally be combined with the subject matter of one or any combination of Examples 21-23 to optionally include generating a planting map during a planting operation before conducting the harvest operation, and the planting map includes the one or more harvest characteristics associated with each zone of the plurality of zones.

Example 25 can include, or can optionally be combined with the subject matter of one or any combination of Examples 21-24 to optionally include determining the actual test weight according to the location of the harvester in the field based upon the estimated test weight for the zone in which the harvester is located and further based upon a measured test weight gathered in the zone in which the harvester is located.

Example 26 can include, or can optionally be combined with the subject matter of one or any combination of Examples 21-25 to optionally include changing one or more aspects of a calculation of the measured test weight based upon the hybrid type according to the location of the harvester in the field.

Example 27 can include, or can optionally be combined with the subject matter of one or any combination of Examples 21-26 to optionally include conducting a yield calculation for a yield monitor based upon the actual test weight.

Example 28 can include, or can optionally be combined with the subject matter of one or any combination of Examples 21-27 to optionally include wherein the actual test weight comprises measuring a volume, a moisture content, and a temperature of the crop during harvest and calculating the actual test weight based upon the measured volume, the moisture content, and the temperature of the crop.

Example 29 can include, or can optionally be combined with the subject matter of one or any combination of Examples 21-28 to optionally include referencing the estimated test weight in calculating the actual test weight.

Example 30 can include, or can optionally be combined with the subject matter of one or any combination of Examples 21-29 to optionally include wherein the assigned hybrid is referenced prior to determining the measured volume, the moisture content, and the temperature of the crop.

Example 31 can include, or can optionally be combined with the subject matter of one or any combination of Examples 21-30 to optionally include the actual test weight comprises measuring a weight, a moisture content, and a temperature of the crop during harvest and calculating the actual test weight based upon the measured weight, the moisture content, and the temperature of the crop.

Example 32 can include, or can optionally be combined with the subject matter of one or any combination of Examples 21-31 to optionally include referencing the estimated test weight in calculating the actual test weight.

Example 33 can include, or can optionally be combined with the subject matter of one or any combination of Examples 21-32 to optionally include wherein the assigned hybrid is referenced prior to determining the measured weight, the moisture content, and the temperature of the crop.

Example 34 can include subject matter (such as an apparatus, a method, a means for performing acts, or a machine readable medium including instructions that, when performed by the machine, that can cause the machine to perform acts), such as a system including one or more instruments on a harvester for measuring a plurality of harvest characteristics while the crop is being harvested, a computer communicating with the one or more instruments and including at least one processor and a memory device, the memory device including instructions that, when executed by the at least one processor, cause the computer to reference data from the one or more instruments and to select one or more harvest characteristics of the plurality of harvest characteristics according to the location of the harvester within a field, the selection causes the computer to determine the location of the harvester within the field, associate the location with a corresponding zone of a plurality of zones in the field, each of the plurality of zones indicates a respective crop planted within the field, assign one or more harvest characteristics to a harvest operation according to at least the corresponding zone and the respective crop within the corresponding zone, wherein the one or more harvest characteristics comprise one or more of an estimated test weight, an actual test weight, one or more aspects related to a yield calculation, a calculation parameter related to a sensor, and a harvester operation, and repeat selecting the one or more harvest characteristics as the harvester changes location within the field.

Example 35 can include, or can optionally be combined with the subject matter of Example 34 to optionally include wherein the plurality of instruments include a moisture sensor, and wherein the instructions alter the calculation parameters related to moisture sensor data collected by the moisture sensor based upon the one or more harvest characteristics of the crop according to the location in the field.

Example 36 can include, or can optionally be combined with the subject matter of one or any combination of Examples 34-35 to optionally include wherein the instructions change the harvester operation including a speed of the harvester in the field based upon a hybrid type of the crop and according to the location of the harvester in the field.

Example 37 can include, or can optionally be combined with the subject matter of one or any combination of Examples 34-36 to optionally include wherein the controller includes a yield monitor having a receiver and processing node in communication with the processor, the receiver and processing node configured to determine a yield of the harvested crop based on the determined location of the harvester and the associated zone and one or more harvest characteristics.

Example 38 can include, or can optionally be combined with the subject matter of one or any combination of Examples 34-36 to optionally include wherein the crop comprises two or more hybrid types, and further comprising instructions that when executed cause the controller to calculate one or more of a yield per each of the two or more of hybrid types, a yield per zone with reference to a planting map, an average actual test weight per hybrid per each of the two or more of hybrid types, a moisture content per each of the two or more of hybrid types, a yield per location in the field, an average test weight per location in the field, and a moisture content per location in the field.

Example 39 can include, or can optionally be combined with the subject matter of one or any combination of Examples 34-38 to optionally include wherein the crop comprises two or more hybrid types, and instructions to assign one or more harvest characteristics to a harvest operation according to at least the corresponding zone and the respective crop within the corresponding zone causes the controller to generate a planting map that assigns each of the plurality of zones with a corresponding hybrid type, and assign an estimated test weight to each zone of the plurality of zones of the planting map.

Example 40 can include, or can optionally be combined with the subject matter of one or any combination of Examples 34-39 to optionally include wherein instructions to select one or more harvest characteristics according to the location of the harvester in the field includes instructions to select the estimated test weight to correspond to the hybrid type applicable to the location of the harvester in the field according to the corresponding zone.

Example 41 can include, or can optionally be combined with the subject matter of one or any combination of Examples 34-40 to optionally include wherein the instructions cause the controller to determine the actual test weight according to the location of the harvester in the field based upon the estimated test weight for the zone in which the harvester is located and further based upon a measured test weight gathered in the zone in which the harvester is located.

Example 42 can include, or can optionally be combined with the subject matter of one or any combination of Examples 34-41 to optionally include wherein the measured test weight is calculated based upon a measured weight and a measured volume of the crop as measured by the one or more instruments on the harvester.

Example 43 can include, or can optionally be combined with the subject matter of one or any combination of Examples 34-42 to optionally include wherein the measured test weight is calculated based upon a measured moisture content of the crop as measured by the one or more instruments on the harvester.

Example 44 can include, or can optionally be combined with the subject matter of one or any combination of Examples 34-43 to optionally include instructions that when executed by the controller cause the controller to change one or more characteristics of a calculation of the measured test weight based upon the hybrid type according to the location of the harvester in the field.

Example 45 can include, or can optionally be combined with the subject matter of one or any combination of Examples 34-44 to optionally include instructions when executed cause the controller to store a plurality of data associated with the plurality of harvest characteristics including the location of the harvester in the field, the hybrid type corresponding to the location of the harvester in the field, and a yield corresponding to the location of the harvester in the field.

Example 46 can include, or can optionally be combined with the subject matter of one or any combination of Examples 34-45 to optionally include instructions when executed cause the controller to store a plurality of data associated with the plurality of harvest characteristics including the plurality of zones in the field, the hybrid type corresponding to each of the plurality of zones, and a yield corresponding to each of the plurality of zones.

Example 47 can include, or can optionally be combined with the subject matter of one or any combination of Examples 34-46 to optionally include accessing the stored plurality of data to plan future seed prescriptions.

Example 48 can include, or can optionally be combined with the subject matter of one or any combination of Examples 1-20 to optionally include wherein the harvester operation comprises changing one or more of a ground speed, a width of stripper/deck plates, a cylinder/rotor clearance, a cylinder/rotor speed, an opening or closing of sieves, a fan/blower speed, a header height, and a reel height of the harvester.

Example 49 can include, or can optionally be combined with the subject matter of one or any combination of Examples 21-33 to optionally include changing one or more of a ground speed, a width of stripper/deck plates, a cylinder/rotor clearance, a cylinder/rotor speed, an opening or closing of sieves, a fan/blower speed, a header height, and a reel height of the harvester in the field based upon a hybrid type of the crop and according to the location of the harvester in the field.

Example 50 can include, or can optionally be combined with the subject matter of one or any combination of Examples 34-47 to optionally include wherein the instructions change the harvester operation including one or more of a ground speed, a width of stripper/deck plates, a cylinder/rotor clearance, a cylinder/rotor speed, an opening or closing of sieves, a fan/blower speed, a header height, and a reel height of the harvester.

Example 51 can include, or can optionally be combined with the subject matter of one or any combination of Examples 34-47 to optionally include the one or more instruments on the harvester for measuring information related to one or more of a plurality of harvest characteristics while the crop is being harvested includes one or more of a GPS locator, a weight sensor, a volume sensor, and a moisture sensor.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like.

Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for adjusting harvest characteristics comprising:
    selecting one or more harvest characteristics according to the location of a harvester within a field including:
        determining the location of the harvester within the field with a GPS locator,
        associating the location with a corresponding zone of a plurality of zones in the field, each of the plurality of zones corresponds to a respective crop planted within the field with a controller of the harvester, and
        assigning one or more harvest characteristics of a harvest operation according to at least the corresponding zone and the respective crop within the corresponding zone with the controller;
    conducting the harvest operation with the harvester;
    changing the harvest operation with the controller according to the assigned one or more harvest characteristics; and
    repeating assigning the one or more harvest characteristics and automatically changing of the harvest operation as the harvester changes location within the field.

2. The method of claim 1, further comprising generating a planting map that includes at least first and second zones of the plurality of zones corresponding to first and second respective crops, and the one or more harvest characteristics include at least a first harvest characteristic for the first respective crop and a second harvest characteristic for the second respective crop, and
    assigning one or more harvest characteristics to the harvest operation according to at least the corresponding zone includes:
    assigning the first harvest characteristic with the harvester in the first zone, and assigning the second harvest characteristic with the harvester in the second zone.

3. The method claim 2, wherein conducting the harvest operation includes calculating yield, and
    with the harvester in the first zone yield is calculated with the first harvest characteristic, and
    with the harvester in the second zone yield is calculated with the second harvest characteristic.

4. The method of claim 2, wherein conducting the harvest operation includes harvesting with the harvester, and
    with the harvester in the first zone the harvester harvests the first respective crop according to the first harvest characteristic, and
    with the harvester in the second zone the harvester harvests the second respective crop according to the second harvest characteristic.

5. The method of claim 1 comprising updating at least one harvest characteristic of the one or more harvest characteristics including:
    measuring at least one property of the respective crop of the corresponding zone with a sensor connected to the harvester,
    calculating at least one updated harvest characteristic for the respective crop, and
    changing the at least one harvest characteristic to the updated harvest characteristic.

6. The method of claim 1, wherein the one or more harvest characteristics comprise one or more of an estimated test weight, an actual test weight, one or more aspects related to a yield calculation, a parameter or calculation related to a sensor, and a harvester operation.

7. The method of claim 6, wherein the harvester operation comprises changing one or more of a ground speed, a width of stripper/deck plates, a cylinder/rotor clearance, a cylinder/rotor speed, an opening or closing of sieves, a fan/blower speed, a header height, and a reel height of the harvester with a signal from the controller.

8. The method of claim 1, wherein the crop comprises two or more hybrid types, and assigning one or more harvest characteristics to a harvest operation according to at least the corresponding zone and the respective crop within the corresponding zone includes:
    generating a planting map that assigns each of the plurality of zones with a hybrid type of the two or more hybrid types; and
    assigning an estimated test weight to each zone of the plurality of zones of the planting map according to the assigned hybrid type of that zone.

9. The method of claim 8, wherein selecting one or more harvest characteristics according to the location of the harvester in the field includes selecting the estimated test weight corresponding to the assigned hybrid type based on the location of the harvester in the field and the corresponding zone.

10. The method of claim 9, comprising conducting a yield calculation for a yield monitor based upon the selected estimated test weight.

11. The method of claim 10, wherein the yield calculation for the yield monitor is performed manually or automatically based upon a planting identifier.

12. The method of claim 8, wherein the estimated test weight for each of the two or more hybrid types comprises a statistical average based upon a historical average for each hybrid type.

13. The method of claim 9, comprising determining an actual test weight according to the location of the harvester in the field based upon the estimated test weight corresponding to which of the plurality of zones the harvester is located in and further based upon a measured test weight as measured by one or more instruments on the harvester.

14. The method of claim 13, further comprising changing one or more aspects of a calculation of the measured test weight based upon the hybrid type according to the location of the harvester in the field.

15. The method of claim 14, wherein the one or more aspects comprise one or more calculation parameters related to moisture sensor data.

16. The method of claim 1, comprising generating a planting map and storing the planting map in a memory device of the controller during a planting operation before conducting the harvest operation, and the planting map includes the one or more harvest characteristics associated with each zone of the plurality of zones.

17. The method of claim 13, wherein generating the planting map includes at least one of manually generating or automatically generating the planting map.

18. The method of clam 1, comprising storing in a memory device of the controller a plurality of data associated with the plurality of harvest characteristics, the location in the field, the hybrid type corresponding to that location in the field, and a yield from which the data is used, measured, or implemented including in planning future seed prescriptions.

19. The method of claim 1, comprising generating a yield for each hybrid type in the field.

20. The method of claim 19, comprising assigning the yield to a planting map to display the yield for each hybrid type at the corresponding zones in the field on a display device connected to the controller.

21. The method of claim 1, wherein the crop comprises two or more hybrid types, and further comprising calculating one or more of a yield per each of the two or more of hybrid types, a yield per zone with reference to a planting map, an average actual test weight per hybrid per each of the two or more of hybrid types, a moisture content per each of the two or more of hybrid types, a yield per location in the field, an average test weight per location in the field, and a moisture content per location in the field.

22. A method for determining a test weight of a crop for yield calculations comprising:
    determining a location of a harvester within the field using a GPS locator;
    associating the location of the harvester with a corresponding zone of a plurality of zones, each of the zones having an assigned hybrid and a corresponding assigned estimated test weight associated with the assigned hybrid;
    selecting the assigned estimated test weight based upon the location of the harvester in the field according to the corresponding zone;
    conducting a harvest operation with the harvester according to the selected assigned estimated test weight;
    determining an actual test weight according to the location of the harvester in the field based upon the assigned estimated test weight for the zone in which the harvester is located and further based upon a measured test weight gathered with an instrument in the zone in which the harvester is located;
    outputting a signal with the actual test weight for calculating a crop yield;
    repeating selecting of the assigned estimated test weight as the harvester changes location within the field; and
    changing one or more aspects of a calculation of the measured test weight based upon hybrid type according to the location of the harvester in the field.

23. The method of claim 22, wherein the step of associating the location of the harvester with a corresponding zone of a plurality of zones includes:
    assigning an estimated test weight for each hybrid type of a crop within a field; and
    dividing the field into a plurality of zones based upon the hybrid type such that each zone has a corresponding hybrid type with an associated estimated test weight.

24. The method of claim 22, the estimated test weight comprises a statistical average based upon a historical average for each hybrid type.

25. The method of claim 22, comprising generating a planting map during a planting operation before conducting the harvest operation, and the planting map includes the one or more harvest characteristics associated with each zone of the plurality of zones.

26. The method of claim 22, conducting a yield calculation for a yield monitor based upon the actual test weight from the signal.

27. The method of claim 22, wherein the actual test weight comprises measuring a volume, a moisture content, and a temperature of the crop during harvest and calculating the actual test weight based upon the measured volume, the moisture content, and the temperature of the crop.

28. The method of claim 27, further comprising referencing the estimated test weight in calculating the actual test weight.

29. The method of claim 27, wherein the assigned hybrid is referenced prior to determining the measured volume, the moisture content, and the temperature of the crop.

30. The method of claim 22, wherein the actual test weight comprises measuring a weight, a moisture content, and a temperature of the crop during harvest and calculating the actual test weight based upon the measured weight, the moisture content, and the temperature of the crop.

31. The method of claim 30, further comprising referencing the estimated test weight in calculating the actual test weight.

32. The method of claim 30, wherein the assigned hybrid is referenced prior to determining the measured weight, the moisture content, and the temperature of the crop.

33. The method of claim 22 comprising changing one or more of a ground speed, a width of stripper/deck plates, a cylinder/rotor clearance, a cylinder/rotor speed, an opening or closing of sieves, a fan/blower speed, a header height, and a reel height of the harvester in the field based upon a hybrid type of the crop and according to the location of the harvester in the field.

34. A system comprising:
one or more instruments on a harvester for measuring information related to one or more of a plurality of harvest characteristics while the crop is harvested;
a controller communicating with the one or more instruments and including at least one processor and a memory device, the memory device including instructions that, when executed by the at least one processor, cause the controller to reference the information gathered from the one or more instruments and to determine one or more harvest characteristics of the plurality of harvest characteristics according to the location of the harvester within a field, the selection causes the controller to:
determine the location of the harvester within the field,
associate the location with a corresponding zone of a plurality of zones in the field, each of the plurality of zones indicates a respective crop planted within the field,
assign one or more harvest characteristics according to at least the corresponding zone and the respective crop within the corresponding zone,
determine a harvest operation associated with the one or more harvest characteristics,
output a signal to change the harvest operation, and
wherein the one or more harvest characteristics comprise one or more of an estimated test weight, an actual test weight, one or more aspects related to a yield calculation, a calculation parameter related to a sensor, and
repeat assignment of the one or more harvest characteristics as the harvester changes location within the field.

35. The system of claim 34, wherein the plurality of instruments include a moisture sensor, and wherein the instructions alter the calculation parameters related to moisture sensor data collected by the moisture sensor based upon the one or more harvest characteristics of the crop according to the location in the field.

36. The system of claim 34, wherein the instructions change the harvester operation including a speed of the harvester in the field based upon a hybrid type of the crop and according to the location of the harvester in the field.

37. The system of claim 34, wherein the controller includes a yield monitor having a receiver and processing node in communication with the processor, the receiver and processing node configured to determine a yield of the harvested crop based on the determined location of the harvester and the associated zone and one or more harvest characteristics.

38. The system of claim 37, wherein the crop comprises two or more hybrid types, and further comprising instructions that when executed cause the controller to calculate one or more of a yield per each of the two or more of hybrid types, a yield per zone with reference to a planting map, an average actual test weight per hybrid per each of the two or more of hybrid types, a moisture content per each of the two or more of hybrid types, a yield per location in the field, an average test weight per location in the field, and a moisture content per location in the field.

39. The system of claim 34, wherein the crop comprises two or more hybrid types, and instructions to assign one or more harvest characteristics according to at least the corresponding zone and the respective crop within the corresponding zone causes the controller to:
generate a planting map that assigns each of the plurality of zones with a corresponding hybrid type; and
assign an estimated test weight to each zone of the plurality of zones of the planting map.

40. The system of claim 39, wherein instructions to select one or more harvest characteristics according to the location of the harvester in the field includes instructions to select the estimated test weight to correspond to the hybrid type applicable to the location of the harvester in the field according to the corresponding zone.

41. The system of claim 40, wherein the instructions cause the controller to determine the actual test weight according to the location of the harvester in the field based upon the estimated test weight for the zone in which the harvester is located and further based upon a measured test weight gathered in the zone in which the harvester is located.

42. The system of claim 41, wherein the measured test weight is calculated based upon a measured weight and a measured volume of the crop as measured by the one or more instruments on the harvester.

43. The system of claim 42, wherein the measured test weight is calculated based upon a measured moisture content of the crop as measured by the one or more instruments on the harvester.

44. The system of claim 41, comprising instructions that when executed by the controller cause the controller to change one or more characteristics of a calculation of the measured test weight based upon the hybrid type according to the location of the harvester in the field.

45. The system of clam 34, comprising instructions when executed cause the controller to store a plurality of data associated with the plurality of harvest characteristics including the location of the harvester in the field, the hybrid type corresponding to the location of the harvester in the field, and a yield corresponding to the location of the harvester in the field.

46. The system of claim 34, comprising instructions when executed cause the controller to store a plurality of data associated with the plurality of harvest characteristics including the plurality of zones in the field, the hybrid type corresponding to each of the plurality of zones, and a yield corresponding to each of the plurality of zones.

47. The system of claim 45, comprising accessing the stored plurality of data to plan future seed prescriptions.

48. The system of claim 34, wherein the instructions change the harvester operation including one or more of a ground speed, a width of stripper/deck plates, a cylinder/rotor clearance, a cylinder/rotor speed, an opening or closing of sieves, a fan/blower speed, a header height, and a reel height of the harvester.

49. The system of claim 34, wherein the one or more instruments on the harvester for measuring information related to one or more of a plurality of harvest characteristics while the crop is being harvested includes one or more of a GPS locator, a weight sensor, a volume sensor, and a moisture sensor.

* * * * *

UNITED STATES PATENT AND TRADEMARK OFFICE
CERTIFICATE OF CORRECTION

PATENT NO. : 9,872,433 B2  
APPLICATION NO. : 15/154526  
DATED : January 23, 2018  
INVENTOR(S) : Acheson et al.

Page 1 of 1

It is certified that error appears in the above-identified patent and that said Letters Patent is hereby corrected as shown below:

In the Drawings

On Sheet 2 of 9, Fig. 2, reference numeral 234, insert --MEMORY DEVICE--

On sheet 3 of 9, Fig. 4, reference numeral 410, Lines 1-2, delete "ASSIGNING OF OF" and insert --ASSIGNING OF-- therefor On sheet 8 of 9, Fig. 10, reference numeral 1016, Lines 1-2, delete "REEL WEIGHT" and insert --REEL HEIGHT-- therefor In the Specification In Column 4, Line 64, after "components.", delete "¶"

In Column 9, Line 60, after "content", insert --,--

In Column 17, Line 53, after "hybrid)", insert --.--

In Column 21, Line 46, delete "704A." and insert --704A,-- therefor

In Column 21, Line 60, delete "706B." and insert --706B,-- therefor

In Column 25, Line 41, delete "S12" and insert --1112-- therefor

In Column 29, Line 19, after "weight", insert --.--

In Column 33, Line 25, after "like.", delete "¶"

Signed and Sealed this  
Twenty-eighth Day of April, 2020

Andrei Iancu  
*Director of the United States Patent and Trademark Office*